United States Patent
Schindler et al.

(10) Patent No.: US 8,968,508 B2
(45) Date of Patent: Mar. 3, 2015

(54) JOINING POLYMERIC MATERIALS

(75) Inventors: Eric S. Schindler, Portland, OR (US); Dervin James, Hillsboro, OR (US); Klaas P. Hazenberg, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 147 days.

(21) Appl. No.: 13/007,788

(22) Filed: Jan. 17, 2011

(65) Prior Publication Data

US 2012/0183748 A1    Jul. 19, 2012

(51) Int. Cl.
*B29C 65/16* (2006.01)
*B29C 65/24* (2006.01)
(Continued)

(52) U.S. Cl.
CPC .......... *B29C 65/245* (2013.01); *B29C 65/1412* (2013.01); *B29C 65/1416* (2013.01); *B29C 65/1435* (2013.01); *B29C 65/1454* (2013.01); *B29C 65/1467* (2013.01); *B29C 65/1483* (2013.01); *B29C 65/16* (2013.01); *B29C 65/1616* (2013.01); *B29C 65/1635* (2013.01); *B29C 65/1654* (2013.01); *B29C 65/1683* (2013.01); *B29C 65/7841* (2013.01); *B29C 65/787* (2013.01); *B29C 66/03* (2013.01); *B29C 66/032* (2013.01); *B29C 66/1122* (2013.01); *B29C 66/21* (2013.01); *B29C 66/242* (2013.01); *B29C 66/43* (2013.01); *B29C 66/431* (2013.01); *B29C 66/71* (2013.01); *B29C 66/712* (2013.01); *B29C 66/733* (2013.01); *B29C 66/73366* (2013.01); *B29C 66/7352* (2013.01); *B29C 66/73521* (2013.01); *B29C 66/73921* (2013.01); *B29C 66/8122* (2013.01); *B29C 66/81267* (2013.01); *B29C 66/836* (2013.01); *B29C 66/843* (2013.01); *B29C 66/919* (2013.01);

(Continued)

(58) Field of Classification Search
CPC  B29C 65/16; B29C 65/1635; B29C 65/1677; B29C 65/168; B29C 65/1683; B32B 7/04; B32B 7/045; B32B 27/00; B32B 37/02; B32B 37/06; B32B 37/0076
USPC .............. 156/272.2, 272.8, 275.1; 428/195.1, 428/411.1
See application file for complete search history.

(56) References Cited

U.S. PATENT DOCUMENTS 3,347,729 A     10/1967   Seefluth
3,384,526 A  *  5/1968   Abramson et al. ............ 156/499
(Continued)

FOREIGN PATENT DOCUMENTS

EP          0061352 A1   9/1982
EP          1518581 A1   3/2005
(Continued)

OTHER PUBLICATIONS

Machine Translation of JP 2004050513 A, Feb. 2004.*
(Continued)

*Primary Examiner* — Daniel McNally
(74) *Attorney, Agent, or Firm* — Banner & Witcoff, Ltd.

(57) ABSTRACT

Systems and methods for joining polymeric materials together may use lasers or broadband infrared heat sources. The polymeric materials are arranged in an overlapping manner and then are exposed to the heat producing radiation for a sufficient time to join the polymeric materials together at the overlapped area. Such systems and methods may avoid the need to add an energy absorbing dopant to the materials being joined. Such systems and methods also may be used on transparent materials.

33 Claims, 24 Drawing Sheets

(51) Int. Cl.
  *B29C 65/14* (2006.01)
  *B29C 65/18* (2006.01)
  *B29C 65/78* (2006.01)
  *B29C 65/00* (2006.01)
  *B29L 22/02* (2006.01)
  *B29L 31/48* (2006.01)
  *B29L 31/50* (2006.01)
  *B29L 31/00* (2006.01)

(52) U.S. Cl.
  CPC ......... *B29C66/939* (2013.01); *B29C 2791/009* (2013.01); *B29C 2793/009* (2013.01); *B29L 2022/025* (2013.01); *B29L 2031/48* (2013.01); *B29L 2031/50* (2013.01); *B29L 2031/7128* (2013.01); *B29L 2031/7148* (2013.01); *B29C 65/18* (2013.01); *B29C 65/1661* (2013.01); *B29C 66/91411* (2013.01); *B29C 66/9161* (2013.01); *B29C 66/91645* (2013.01); *B29C 66/934* (2013.01)
  USPC ...................................................... 156/272.8

(56) References Cited

U.S. PATENT DOCUMENTS

| | | | |
|---|---|---|---|
| 3,560,291 A | 2/1971 | Foglia et al. | |
| 3,981,230 A | 9/1976 | Lee | |
| 4,540,392 A | 9/1985 | Junod et al. | |
| 5,840,147 A | 11/1998 | Grimm | |
| 6,387,209 B1 * | 5/2002 | Nettesheim | ............... 156/379.6 |
| 7,244,482 B2 * | 7/2007 | Bager et al. | .................. 428/35.2 |
| 7,276,136 B2 | 10/2007 | Sallavanti et al. | |
| 7,344,671 B2 | 3/2008 | Basque et al. | |
| 7,462,256 B2 | 12/2008 | Basque et al. | |
| 2004/0056006 A1 | 3/2004 | Jones et al. | |
| 2005/0081991 A1* | 4/2005 | Hatase et al. | ............... 156/272.8 |
| 2005/0208361 A1* | 9/2005 | Enjoji et al. | ..................... 429/36 |
| 2007/0051461 A1 | 3/2007 | Pfleging et al. | |
| 2008/0004363 A1* | 1/2008 | Rosenberger | ..................... 522/2 |
| 2008/0145682 A1 | 6/2008 | Rasmussen et al. | |
| 2008/0153957 A1 | 6/2008 | Miyamoto | |
| 2009/0231585 A1* | 9/2009 | Tsuneishi et al. | ............. 356/432 |
| 2010/0009150 A1* | 1/2010 | Mitooka et al. | ................. 428/220 |
| 2010/0167060 A1* | 7/2010 | Matsuo | ...................... 428/411.1 |

FOREIGN PATENT DOCUMENTS

| | | |
|---|---|---|
| EP | 2022619 A1 | 2/2009 |
| EP | 2204274 A1 | 7/2010 |
| FR | 2286701 A1 | 4/1976 |
| JP | 2004050513 A * | 2/2004 |
| JP | 2004142225 A | 5/2004 |

OTHER PUBLICATIONS

International Search Report and Written Opinion, issued Jun. 20, 2012, International Patent Application No. PCT/US2012/020333.

Bachmann, F.G. et al ; (Jan. 1, 2002) "Laser welding of polymers using high-power diode lasers"; Source: Proceedings of SPIE, SPIE, U.S., vol. 4637, pp. 505-518, XP002312667, ISSN: 0277-786X, DOI: 10.1117/12.470660.

* cited by examiner

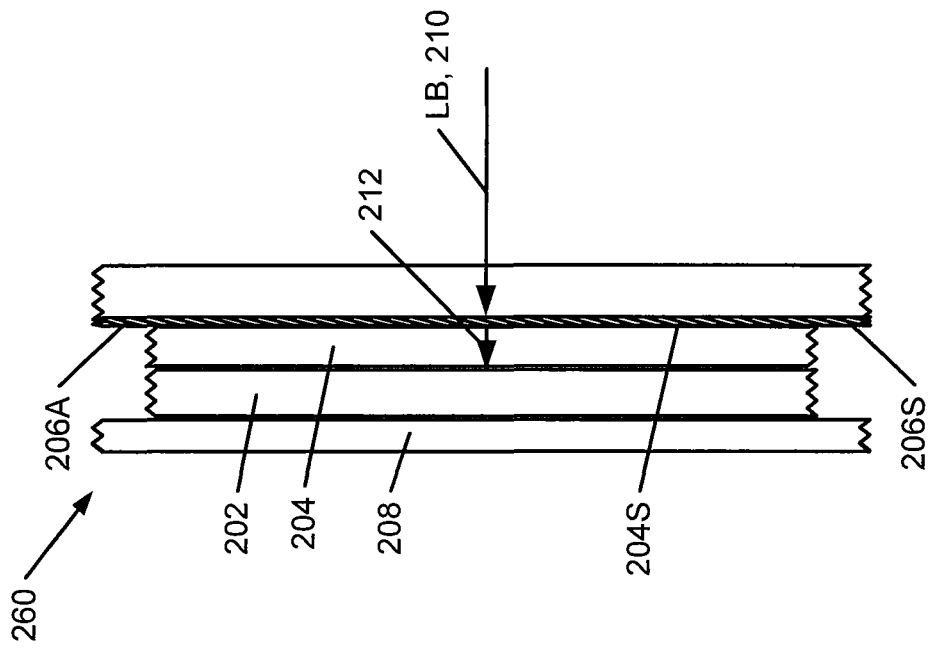
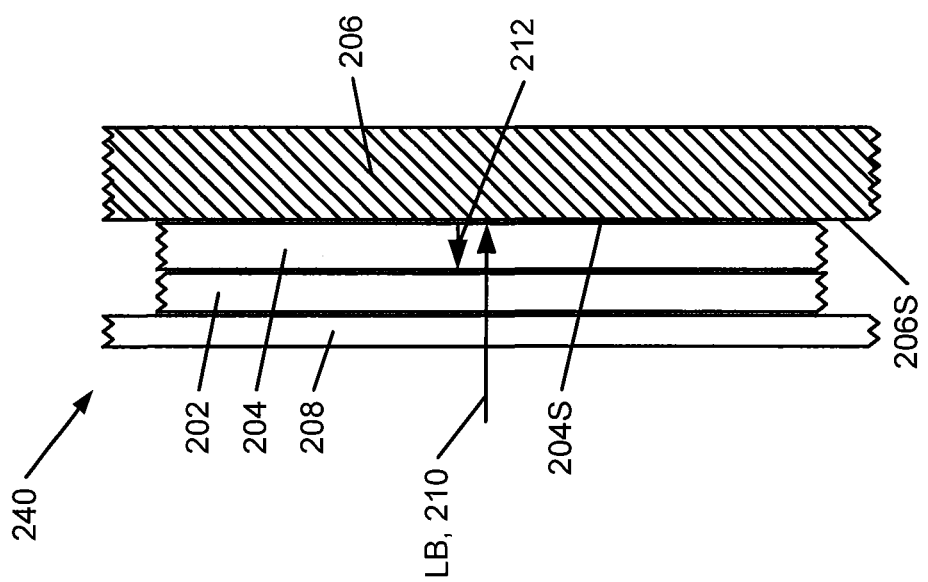

JOINING POLYMERIC MATERIALS

FIELD OF THE INVENTION

The present invention relates generally to systems and methods for joining polymeric materials together (e.g., two or more polymeric sheet members) using electromagnetic radiation, as well as to the products produced by such systems and methods.

BACKGROUND

FIG. 1 schematically illustrates one known laser heating system for joining two polymeric sheet materials S1 and S2 together. In such a system, as is conventionally known, two polymeric sheet materials S1 and S2 can be welded together if: (a) one layer S1 of material is highly transmissive to the laser energy (from laser beam LB), and (b) the other layer S2 of material is highly absorptive of the laser energy (or is otherwise treated to be highly absorptive of the laser energy). In this system and method, as the laser absorptive sheet S2 heats up, it melts the polymeric materials at the junction of the transmissive and absorptive materials, causing the two layers to melt together and thereby be "welded" together.

There are some issues with this technique. For example, for clear polymeric sheet materials, one of the two sheets (S2 in the example of FIG. 1) has to be treated in some manner so as to become more laser energy absorptive. This may be accomplished, for example, by doping the sheet material S2 with a laser absorptive material. The dopant, however, may affect other electromagnetic transmission properties of the sheet member (e.g., its color, opacity, etc.). As another example, a polymeric sheet member (e.g., S2) can be made more laser absorptive by applying a laser absorptive material 10 to a surface of at least one of the sheet materials at the desired joining location (e.g., by printing or otherwise coating a laser absorptive material on a surface of the sheet material). One such laser absorptive material 10 for this type of process is a near infrared absorbing material known as CLEARWELD®, available from Gentex Corporation. As noted above, in this method, as the laser absorptive sheet S2 heats up (shown by the heat arrows in FIG. 1), it melts the plastic material of both sheet members S1 and S2 at the junction of the transmissive and absorptive materials, causing the two layers to melt or stick together and thereby be "welded" together.

The use of such near infrared absorbing materials on the plastic sheets, however, significantly increases the costs, time, and difficulties involved in joining two polymeric film or sheet materials together. Moreover, it introduces a foreign material within the joint.

Other systems and methods for joining two plastic sheet materials together are described in U.S. Pat. No. 3,384,526, which patent is entirely incorporated herein by reference. This system uses a broadband heat lamp source with heat absorbing materials (such as graphite paint) provided on a work support in order to produce a weld.

There is room in the art for improvements and advances in systems and methods for joining polymeric materials (such as polymeric films or sheet materials) together, particularly in instances wherein the polymeric materials to be joined are substantially transparent to radiation over the visible wavelength spectrum or at least a portion of the visible wavelength spectrum.

SUMMARY

Aspects of the present invention relate to systems and methods for joining polymeric materials (e.g., two or more polymeric sheet materials) together. Some aspects of this invention relate to methods for joining such polymeric materials without the need for special dopants, additives, or other foreign materials to the polymeric material(s). Additionally, some aspects of this invention relate to the ability to join clear polymeric materials together, e.g., in clean, clear, and well defined welds or seams. The term "weld," as it is used herein in the context of describing aspects of this invention means any manner of joining two separate elements together by fusing techniques so that the elements remain bonded together without the need for separate mechanical connectors.

As some more specific examples, such systems and methods may include, for example: (a) arranging a first polymeric sheet portion and a second polymeric sheet portion in an overlapping manner (at least partially overlapping); (b) placing at least a portion of the first polymeric sheet portion and the second polymeric sheet portion adjacent a heating member (e.g., a base support, a cover member, another member that supports at least one of the polymeric sheet portions, etc.) such that a major surface of the first polymeric sheet portion is adjacent the heating member; and (c) exposing an overlapped area of the first and second polymeric sheet portions to laser energy for a sufficient time to join the first and second polymeric sheet portions together at the overlapped area exposed to the laser energy, wherein the laser energy is substantially absorbed by the heating member to thereby locally heat the heating member. The heating of the heating member increases a temperature of the first polymeric sheet portion and the second polymeric sheet portion to thereby soften or melt the first and second polymeric sheet portions at the overlapped area exposed to the laser energy and to thereby join the first and second polymeric sheet portions together at the overlapped area exposed to the laser energy. The "heating member" is a member that heats up upon exposure to the laser energy and may include (e.g., as a surface layer) a material that: (a) is a good absorber of laser energy for at least one laser wavelength or a narrow laser wavelength band (so it adequately and quickly heats up), (b) has low heat conductivity (so the heat relatively localized during the heating step), (c) has a high melting point relative to the polymeric sheet portions, and (d) has a low reflectivity of the laser energy. Such materials may include graphite, rubber, ceramic, and/or stone materials (optionally, these materials may include an absorptive material on a surface thereof, such as carbon black, graphite paint, CLEARWELD® near infrared absorbing material available from Gentex Corporation, etc.).

Other aspects of this invention relate to systems and methods of joining polymeric materials (e.g., two or more polymeric sheet materials) to one another using broadband infrared energy as the heat source. Such systems and methods may include, for example: (a) applying an infrared absorptive material (e.g., carbon black, graphite paint, CLEARWELD® near infrared absorbing material available from Gentex Corporation, etc.) to a first location on a surface of a holding member (e.g., a base support member, a cover member, a frame or other support member) and, optionally, to a second location on the surface of the holding member, wherein the second location may be separate, discrete, and disconnected from the first location, and wherein the infrared absorptive material increases the infrared absorptivity at the first (and second) location(s) on the surface of the holding member as compared to an infrared absorptivity of the surface of the holding member at areas away from the first (and second) location(s) that do not include infrared absorptive material; (b) arranging a first polymeric sheet portion and a second polymeric sheet portion to be held in an overlapping manner, at least in part, by the holding member; and (c) exposing at least some of the overlapped area of the first and second polymeric sheet portions to broadband infrared energy for a sufficient time to join the first and second polymeric sheet portions together at areas adjacent to the first (and second) location(s) on the holding member. The infrared energy is substantially absorbed by the infrared absorptive material at the first (and second) location(s) to thereby locally heat the first and second polymeric sheet portions at the areas adjacent to the first (and second) location(s). Any number of separated locations for the absorptive material application, in any desired patterns, may be provided without departing from this invention.

In other example systems and methods according to this invention, the infrared absorptive material may be applied to at least one of the portions. Such systems and methods may include, for example: (a) applying an infrared absorptive material (e.g., carbon black, graphite paint, CLEARWELD® near infrared absorbing material available from Gentex Corporation, etc.) to a first location on a surface of at least one of a first polymeric sheet portion and/or a second polymeric sheet portion and, optionally, to a second location on the surface of at least one of the first polymeric sheet portion and/or the second polymeric sheet portion, wherein the second location, when provided, is separate, discrete, and discontinuous from the first location, and wherein the infrared absorptive material increases the infrared absorptivity at the first (and second) location(s) as compared to an infrared absorptivity of the surface of the polymeric sheet portion(s) at areas away from the first (and second) location(s) that do not include infrared absorptive material; (b) arranging the first and second polymeric sheet portions in an overlapping manner such that the sheet portions overlap at least at the first (and second) location(s); and (c) exposing at least some of the overlapping the first and second polymeric sheet portions to broadband infrared energy for a sufficient time to join the first and second polymeric sheet portions together at areas adjacent to the first (and second) location(s). Again, the infrared energy is substantially absorbed by the infrared absorptive material at the first (and second) location(s) to thereby locally heat the first and second polymeric sheet portions at the areas adjacent to the first (and second) location(s).

Still additional aspects of this invention relate to products that include two joined polymeric sheet portions, e.g., made by the laser and broadband heating methods described above.

BRIEF DESCRIPTION OF THE DRAWINGS

The above and other objects, features, and advantages of the present invention will be readily apparent and fully understood from the following detailed description, taken in connection with the appended drawings, in which:

FIGS. 2A through 2D are schematic diagrams illustrating various examples of laser based systems and methods for joining polymeric materials together according to some aspects of this invention;

The reader is advised that the attached drawings are not necessarily drawn to scale. Also, when the same reference number appears in more than one drawing, that reference number is intended to be used for the same or similar parts or features throughout all of the figures in which it is present.

DETAILED DESCRIPTION

Figure 1:
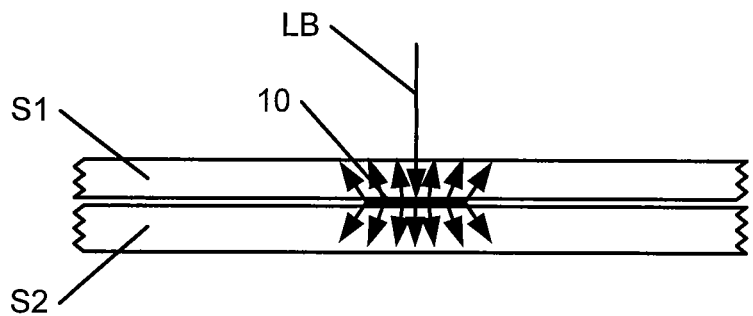
FIG. 1 illustrates an example of a known method for joining two polymeric sheet materials together.

Various specific examples of the invention are described in detail below in conjunction with the attached drawings. It is to be understood that other specific arrangements of parts and structures may be utilized; structural and functional modifications may be made; and changes to the described steps may be made (e.g., adding steps, changing steps, omitting steps, changing the order of steps, etc.) without departing from the scope of the present invention. Also, while the terms "top," "bottom," "upper," "lower," "front," "back," "rear," "side," "underside," "overhead," and the like may be used in this specification to describe various example features and elements of the invention, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this invention.

In general, as described above, aspects of this invention relate to systems and methods for joining polymeric portions (e.g., two or more polymeric sheet materials) together. Specific examples of the invention are described in more detail below. The reader should understand that these specific examples are set forth merely to illustrate examples of the invention, and they should not be construed as limiting the invention.

A. General Description of Systems and Methods for Joining Polymeric Materials and Products Produced using such Systems and Methods 1. Examples of Laser Heating Source Embodiments of the Invention In general, aspects of this invention relate to systems and methods of joining polymeric materials (e.g., two or more polymeric sheet materials) to one another. Such systems and methods may include, for example: (a) arranging a first polymeric sheet portion and a second polymeric sheet portion in an overlapping manner; (b) placing at least a portion of the first polymeric sheet portion and the second polymeric sheet portion adjacent a heating member such that a major surface of the first polymeric sheet portion is adjacent the heating member; and (c) exposing an overlapped area of the first and second polymeric sheet portions to laser energy for a sufficient time to join the first and second polymeric sheet portions together at the overlapped area exposed to the laser energy, wherein the laser energy is substantially absorbed by the heating member to thereby locally heat the heating member, wherein the heating of the heating member increases a temperature of the first polymeric sheet portion and the second polymeric sheet portion to thereby soften or melt the first and second polymeric sheet portions at the overlapped area exposed to the laser energy and to thereby join the first and second polymeric sheet portions together at the overlapped area exposed to the laser energy.

The "polymeric sheet portions," as that term is used herein, may constitute separate and distinct sheet members, or they may constitute different areas on a single sheet member (e.g., and made to overlap in the joining process by folding or in some other manner).

The "heating member" constitutes a member that heats up upon exposure to the radiation and may take on a variety of forms without departing from this invention. For example, the heating member may be a base support member on which a major surface of at least one of the polymeric sheet portions is laid. As another example, the heating member may be a cover member that overlays at least some portion of the first and second polymeric sheet portions, e.g., to hold them in place with respect to one another and/or with respect to another support. As yet another example, the heating member might constitute at least a portion of a frame or other support member on which a major surface of at least one of the polymeric sheet portions is engaged (e.g., in a vertical, horizontal, or other orientation). This "heating member," irrespective of its form, arrangement, or orientation with respect to the polymeric materials, may be made from a material that: (a) is a good absorber of laser energy for at least one laser wavelength or a narrow laser wavelength band, (b) has low heat conductivity, (c) has a high melting point relative to the second polymeric sheet portion, and (d) has a low reflectivity of the laser energy. As some more specific examples, the heating member may be constructed from or include, at least in part (e.g., at the overlapped area), a material selected from the group consisting of: graphite, a rubber material, a ceramic material, and a stone material (optionally coated or otherwise provided with a laser absorptive material, such as carbon black, graphite paint, etc.).

In at least some examples of systems, methods, and products according to this invention, neither the first polymeric sheet portion nor the second polymeric sheet portion needs to be treated or doped to increase a laser energy absorption characteristic thereof. Furthermore, each of the first and second polymeric sheet portions may be substantially transparent to the laser energy. Additionally, in at least some examples of this invention, at least one of the first and second polymeric sheet portions may be substantially transparent to radiation over at least a portion of (or the entire) the visible wavelength spectrum. The term "substantially transparent," as used herein, includes materials completely transparent to the noted type of radiation and further includes materials in which at least 90% of then noted radiation passes. The first and second polymeric sheet portions may be the same or different materials from one another, e.g., polyurethane materials (including thermoplastic polyurethane materials or TPUs), other thermoplastic elastomeric materials, polyethylene materials, etc.

Any suitable or desired laser beam and/or beam characteristics may be used without departing from the invention, as long as the desired heating effect is produced. Suitable lasers may include lasers producing a beam within a wavelength range of 800 to 1200 nm, and in some examples, within a wavelength range of 800 to 1000 nm. As some more specific examples, the laser beam may be at a wavelength of about 808 nm or about 940 nm. The laser energy may be transmitted as a laser beam having: (a) a spot width within a range of 0.2 to 8 mm, (b) a laser power level within a range of 10 to 250 watts, (c) a scanning speed within a range of 0.1 to 4 m/min, and/or (d) a spot area within a range of 0.1 to 220 $mm^2$.

Additional aspects of this invention relate to systems for performing the methods described above (e.g., including a laser, a laser scanning system, and a heating system (such as a cover member, a base support member, or other support member that induces heating, as described above and as described in more detail below)).

Still additional aspects of this invention relate to products that include joined polymeric materials, e.g., made by the methods described above. In accordance with at least some examples of this invention, such products may include, for example, joined polymeric sheet portions wherein at least one of the sheet portions is made from a substantially transparent polymeric material. Additionally or alternatively, products in accordance with at least some examples of this invention need not include materials (such as dopants, applied absorbent materials, etc.) that increase the laser absorption properties of the polymeric sheet portions.

2. Examples of Broadband Heating Source Embodiments of the Invention

Other aspects of this invention relate to systems and methods of joining polymeric materials (e.g., two polymeric sheet materials) to one another using broadband infrared energy as the heat source. Such systems and methods may include, for example: (a) applying an infrared absorptive material (e.g., carbon black, graphite paint, CLEARWELD® near infrared absorbing material available from Gentex Corporation, etc.) to a first location on a surface of a holding member (e.g., a base support member, a cover member, a frame or other support member, etc.) and, optionally, to a second location on the surface of the holding member, wherein the second location (when present) is separate and discrete from the first location, and wherein the infrared absorptive material increases the infrared absorptivity at the first (and second) location(s) on the surface of the holding member as compared to an infrared absorptivity of the surface of the holding member at areas away from the first (and second) location(s) that do not include infrared absorptive material; (b) arranging a first polymeric sheet portion and a second polymeric sheet portion to be held in an overlapping manner, at least in part, by the holding member; and (c) exposing at least some of the overlapped area of the first and second polymeric sheet portions to broadband infrared energy for a sufficient time to join the first and second polymeric sheet portions together at areas adjacent to the first (and second) location(s) on the holding member, wherein the infrared energy is substantially absorbed by the infrared absorptive material at the first (and second) location(s) to thereby locally heat the first and second polymeric sheet portions at the areas adjacent to the first (and second) location(s).

In such systems and methods, the heating of the first and second polymeric sheet portions increases a temperature of the second polymeric sheet portion and the first polymeric sheet portion to thereby soften and/or melt the first and second polymeric sheet portions at the overlapped area and to thereby join the first and second polymeric sheet portions together at the overlapped area and not at the areas away from the first (and second) location(s) that do not include infrared absorptive material. In these systems and methods, in accordance with at least some examples of this invention, neither the first nor the second polymeric sheet portion needs to be treated or doped to increase an infrared energy absorption characteristic thereof.

In such systems and methods, a temperature of the holding member during the broadband heating will be at least 10% higher (and in some examples, at least 15% higher, at least 20% higher, or even at least 25% higher) at the first (and second) location(s) as compared to locations of the holding member exposed to the broadband infrared energy and located at least 5 cm away from any infrared absorptive material. This percentage increase is expressed in terms of changes in temperature using the Celsius temperature scale. Additionally or alternatively, in such systems and methods, a temperature of the surface of the holding member during the broadband heating will be at least 10° C. higher (and in some examples, at least 15° C. higher, at least 20° C. higher, or even at least 25° C. higher) at the first (and second) location(s) as compared to areas of the holding member exposed to the broadband infrared energy and located at least 5 cm away from any infrared absorptive material.

In at least some examples of systems, methods, and products according to this aspect of the invention, each of the first and second polymeric sheet portions may be substantially transparent to the infrared energy. Additionally, in at least some examples of this invention, at least one of the first and second polymeric sheet portions may be substantially transparent to radiation over at least a portion of (or the entire) the visible wavelength spectrum. Again, the first and second polymeric sheet portions may be the same or different from one another, e.g., polyurethane materials (including thermoplastic polyurethane materials or TPUs), other thermoplastic elastomeric materials, polyethylene materials, etc.

In other example systems and methods according to this invention, the infrared absorptive material may be applied to at least one of the sheet portions. Such systems and methods may include, for example: (a) applying an infrared absorptive material (e.g., carbon black, graphite paint, CLEARWELD® near infrared absorbing material available from Gentex Corporation, etc.) to a first location on a surface of a first polymeric sheet portion and, optionally, to a second location on the surface of the first polymeric sheet portion, wherein the second location is separate and discrete from the first location, and wherein the infrared absorptive material increases the infrared absorptivity at the first (and second) location(s) on the surface of the first polymeric sheet portion as compared to an infrared absorptivity of the surface of the first polymeric sheet portion at areas away from the first (and second) location(s) that do not include infrared absorptive material; (b) arranging the first polymeric sheet portion and a second polymeric sheet portion in an overlapping manner such that the second polymeric sheet portion overlaps the first polymeric sheet portion at least at the first (and second) location(s); and (c) exposing at least some of the overlapping first and second polymeric sheet portions to broadband infrared energy for a sufficient time to join the first and second polymeric sheet portions together at areas adjacent to the first (and second) location(s), wherein the infrared energy is substantially absorbed by the infrared absorptive material at the first (and second) location(s) to thereby locally heat the first and second polymeric sheet portions at the areas adjacent to the first (and second) location(s). The heating of the first and second polymeric sheet portions increases a temperature of the second polymeric sheet portion and the first polymeric sheet portion to thereby soften and/or melt the first and second polymeric sheet portions at and near the first (and second) location(s) to thereby join the first and second polymeric sheet portions together at the first (and second) location(s) and not at areas away from the first (and second) location(s) that do not include infrared absorptive material.

In such systems and methods, a temperature of the sheet portion to which the absorptive material is applied during the broadband heating will be at least 10% higher (and in some examples, at least 15% higher, at least 20% higher, or even at least 25% higher) at the first (and second) location(s) as compared to areas of the same sheet portion exposed to the broadband infrared energy and located at least 5 cm away from any infrared absorptive material (as noted above, the percentage change is based on changes using the Celsius temperature scale). Additionally or alternatively, in such systems and methods, a temperature of the sheet portion to which the infrared absorptive material is applied will be at least 10° C. higher during the broadband heating (and in some examples, at least 15° C. higher, at least 20° C. higher, or even at least 25° C. higher) at the first (and second) location(s) as compared to locations of that sheet portion exposed to the broadband infrared energy and located at least 5 cm away from any infrared absorptive material.

In at least some examples of systems, methods, and products according to this aspect of this invention, each of the first and second polymeric sheet portions may be substantially transparent to the infrared energy. Additionally, in at least some examples of this invention, at least one of the first and second polymeric sheet portions may be substantially transparent to radiation over at least a portion of (or the entire) the visible wavelength spectrum. Again, the first and second polymeric sheet portions may be the same or different from one another, e.g., polyurethane materials (including thermoplastic polyurethane materials or TPUs), other thermoplastic elastomeric materials, polyethylene materials, etc.

Additional aspects of this invention relate to systems for performing the methods described above (e.g., including a heating device, such as an oven); a cover member, a base support member, or a frame or other support member, as described above and as described in more detail below); a conveyance system (e.g., to move the polymeric portions through the oven); etc.

Still additional aspects of this invention relate to products that include two or more joined polymeric sheet portions, e.g., made by the broadband heating methods described above. In accordance with at least some examples of this invention, such products may include, for example, joined polymeric sheet portions wherein at least one of the sheet portions is made from a substantially transparent polymeric material. Additionally or alternatively, products in accordance with at least some examples of this invention need not include materials (such as dopants, applied absorbent materials, etc.) that increase the laser absorption properties of the polymeric sheet portions.

Specific examples of the invention are described in more detail below. The reader should understand that these specific examples are set forth merely to illustrate examples of the invention, and they should not be construed as limiting the invention.

B. Specific Examples of Systems and Methods for Joining Polymeric Materials and Products Produced using such Systems and Methods The various figures in this application illustrate various examples of systems and methods for joining polymeric materials (such as polymeric sheet materials).

1. Laser Heating Based Examples

Figure 3:
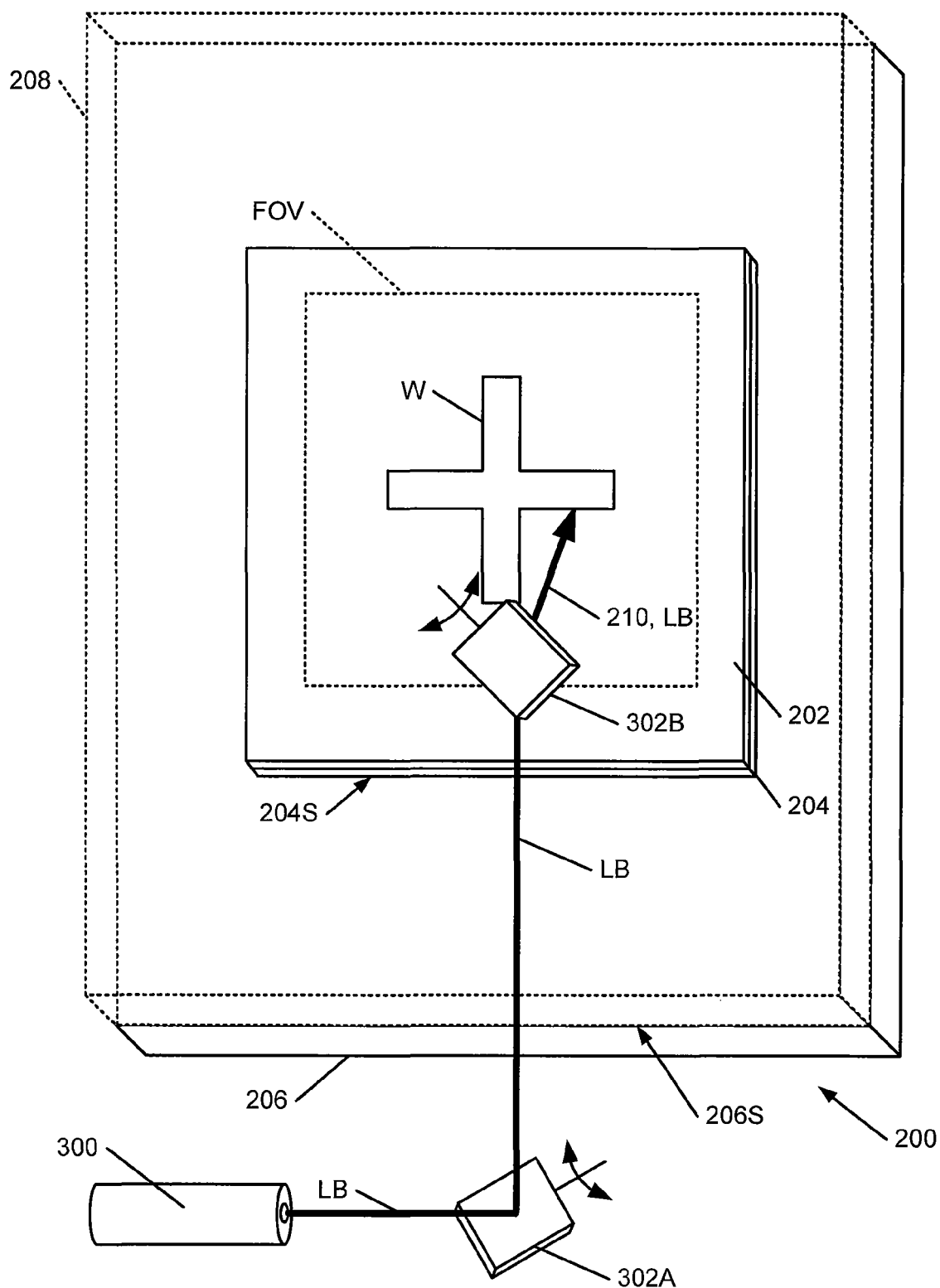
FIGS. 3 and 4 illustrate various examples and features of laser scanning systems and methods according to some aspects of this invention.
Figure 4:
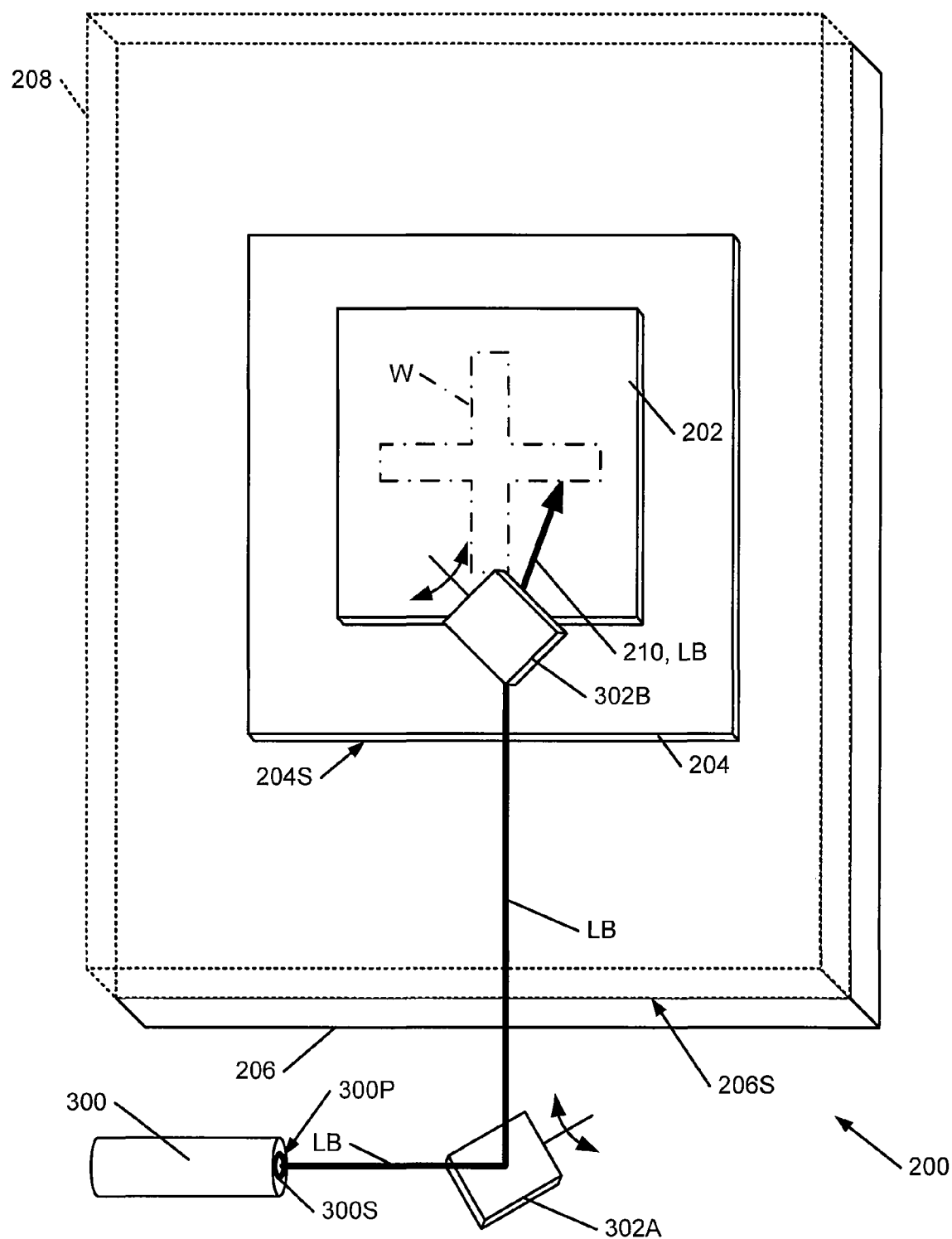

FIGS. 2A through 2D illustrate various examples of laser welding systems and methods in which two sheet portions of polymeric material (e.g., transparent polymeric sheets, separate sheets, separate sections of one polymeric sheet, etc.)

may be joined together. These example systems and methods may be used in conjunction with laser scanning equipment, e.g., as shown in FIGS. 3 and 4, which enable precise application of the laser energy (e.g., laser beam LB) at well defined and precise locations to form the desired weld, welds, or patterns of welds. These various figures will be described in more detail below.

Figure 2A:
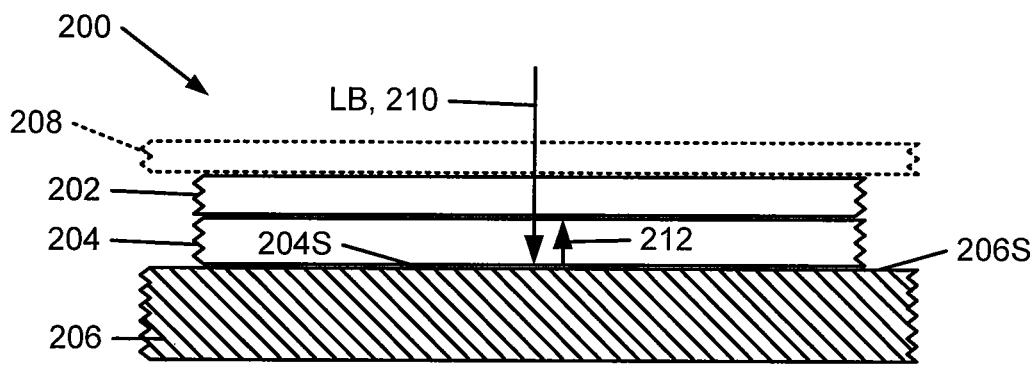

As shown in FIG. 2A, in this example system 200, a first polymeric sheet member 202 and a second polymeric sheet member 204 are arranged in an at least partially overlapping manner on a base support member 206 such that a major surface 204S of the second polymeric sheet member 204 is adjacent (and optionally in contact with) a surface 206S of the base support 206. In this example system 200, the base support 206 includes a material that: (a) is a good absorber of laser energy for at least one laser wavelength or a narrow laser wavelength band (so it adequately and quickly heats up), (b) has low heat conductivity (so the heat remains localized), (c) has a high melting point relative to the second polymeric sheet member 204, and (d) has a low reflectivity of the laser energy. Examples of suitable materials include graphite, rubber materials, ceramic materials, and stone materials (and, optionally, these materials may have a surface made from or coated with carbon black, graphite paint, etc.). The phrase "in an at least partially overlapping manner" is intended to convey that the two polymeric sheet members 202 and 204 need not be completely coextensive with one another. Rather, one sheet may be larger than the other and/or no edges of the sheets need to align with one another. One sheet may be fully surrounded by the other sheet, or the edges of each sheet may extend at some locations beyond the edges of the other sheet at that location. The sheet members 202 and 204 may constitute separate areas or portions of a single polymeric sheet (that is folded or otherwise arranged in an overlapping manner). Any desired overlapping arrangements of polymeric material are possible without departing from this invention.

Once properly positioned, if necessary, the sheet members 202 and 204 may be secured together in place with respect to one another and/or with respect to the base support 206. Any desired way of securing these members together may be used without departing from this invention, such as clamps, clips, adhesives, etc. In this illustrated example, a frame or cover member 208 is provided to help hold the sheet members 202 and 204 in place with respect to one another and with respect to the base support 206. The frame or cover member 208 may be at least partially transparent to the incident laser energy to be used for the welding process (as described in more detail below), or it may include one or more openings at appropriate locations (e.g., like a frame having outer edges and an open interior) to allow the laser radiation to pass without contacting member 208. The frame or cover member 208 may be included as part of an integrated structure with the base support 206, if desired. When present as a cover member 208, the cover member material may include, but is not limited to: quartz glass, other glass materials, etc., that will allow the laser radiation to pass through.

Once in place, at least some of the overlapped areas of the sheet members 202 and 204 are exposed to laser energy for a sufficient time to join the polymeric sheet members 202 and 204 together at the overlapped area that is exposed to the laser radiation. In this method, as shown in FIG. 2A, the laser energy substantially passes through the cover member 208 (if any), the first sheet 202, and the second sheet 204 where it contacts the surface 206S of the base support 206 (shown by arrow 210 in FIG. 2A) (the sheet members 202 and 204 may be substantially transparent to the laser energy). The laser energy is substantially absorbed by the base support 206 to thereby locally heat the base support 206 at the incident laser beam location. This localized heating of the base support 206 increases a temperature of the second polymeric sheet member 204 and then the first polymeric sheet member 202 (as shown by heat flow arrow 212) to thereby soften and/or melt the first and second polymeric sheet members 202 and 204 at the overlapped area at the localized location of the laser energy exposure. This softening and/or melting joins the first and second polymeric sheet members 202 and 204 together at the localized location of the laser energy exposure.

Any desired type of polymeric material may be joined using systems and methods in accordance with this aspect of the invention. As some more specific examples, advantageously, in this example system and method according to the invention, neither the first nor the second polymeric sheet member 202 and/or 204 (which may be made from the same or different materials) needs to be treated or doped to increase a laser energy absorption characteristic thereof (e.g., there is no need to apply a laser absorbing material to a surface of either sheet member 202 or 204, there is no need to add a laser absorbent dopant to either sheet member 202 or 204, etc.). In at least some example systems and methods according to this invention, the polymeric sheet members 202 and 204 will be substantially transparent to radiation over at least a portion of the visible wavelength spectrum (or even over the entire visible spectrum). As some more specific examples, the polymeric sheet members 202 and/or 204 may be thermoplastic polyurethane materials, polyethylene materials, etc. The sheet members 202 and 204 may have the same or different thicknesses, e.g., in the range of 0.1 to 2.5 mm (and in some examples, from 0.2 to 1.5 mm thick, and even from 0.25 to 1 mm thick).

The laser energy also may take on various different forms or characteristics without departing from this invention. For example, in the laser beam exposure step, the laser may emit a beam having a wavelength within the range of 800 to 1200 nm, and in some examples, within a wavelength range of 800 to 1000 nm. In some even more specific examples, the laser wavelength will be about 808 nm or about 940 nm. Other characteristics of the incident laser energy also may be varied or controlled in systems and methods in accordance with examples of this invention. As some more specific examples, the laser energy may be transmitted as a laser beam having a spot width within a range of 0.2 to 8 mm (and in some examples, from 0.25 to 6 mm or from 0.5 to 3 mm) and/or as a laser beam having a spot area within a range of 0.1 to 220 mm$^2$ (and in some examples, from 0.2 to 115 mm$^2$ or from 0.75 to 30 mm$^2$). As another example, the laser energy may be transmitted as a laser beam at a laser power within a range of 10 to 250 watts (and in some examples, from 15 to 150 watts or from 20 to 100 watts). As yet another example, in the exposing step, the laser energy may be transmitted as a laser beam moving with respect to the sheet members 202 and 204 at a scanning speed (over the surface to be scanned) within a range of 0.1 to 4 m/min (and in some examples, from 0.2 to 2 m/min or from 0.25 to 1 m/min). Laser exposure conditions may further depend on features of the materials to be joined or other factors, such as the polymer compositions, sheet thicknesses, desired weld sizes, necessary weld strength, etc. Those skilled in the art will be able to determine and select the appropriate laser wavelengths and/or scanning conditions for joining two (or more) polymeric materials together, e.g., through the use of routine experimentation.

Figure 2B:
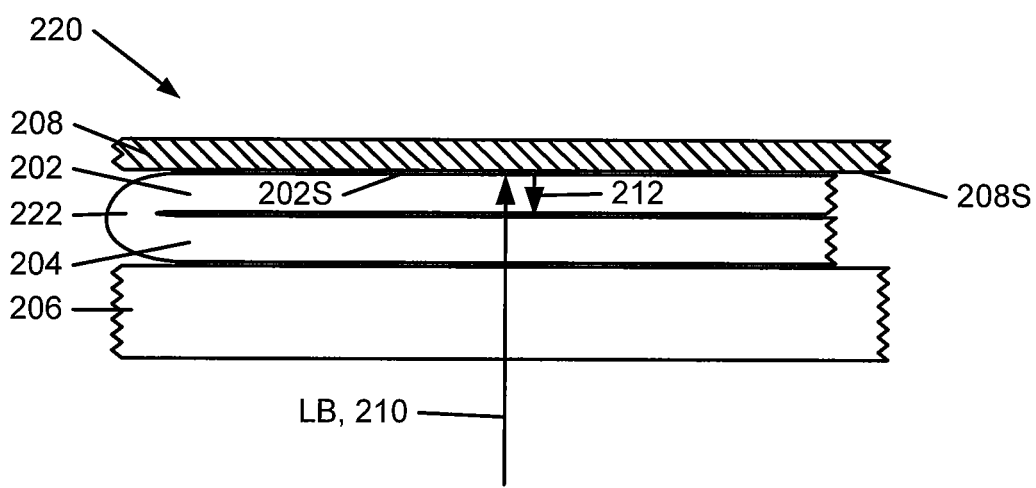

FIG. 2B illustrates another example system 220 and method for joining polymeric materials together in accordance with this invention. While at least some of the various parts of this system 220 may have different functions from the system 200 described above in conjunction with FIG. 2A, the same reference numbers will be used for the same parts (although the differing function will be described). In this example system 220 and method, the base support 206 includes at least a portion that is transparent (or substantially transparent) to the laser energy LB (e.g., made from quartz glass or other glass materials), and the laser energy LB is incident from the bottom side of the support arrangement. Additionally, in this example system 220 and method, the cover member 208 is made from or has a surface that includes a material that: (a) is a good absorber of laser energy for at least one laser wavelength or a narrow laser wavelength band, (b) has low heat conductivity, (c) has a high melting point relative to the first polymeric sheet member 202, and (d) has a low reflectivity of the laser energy. Examples of suitable materials include graphite, rubber materials, ceramic materials, and stone materials (optionally, these materials may include a surface coated with graphite paint, carbon black, or other absorber materials). FIG. 2B also illustrates that the polymeric sheets 202 and 204 may be part of a single sheet, as evidenced by the fold 222.

Once properly positioned and secured (e.g., as described above), with a major surface 202S of the first polymeric sheet member 202 positioned adjacent a major surface 208S of the cover member 208, at least some of the overlapped areas of the sheet members 202 and 204 are exposed to laser energy for a sufficient time to join the polymeric sheet members 202 and 204 together at the overlapped area. In this method, as shown in FIG. 2B, the laser energy LB substantially passes through the base support 206, the second sheet 204, and the first sheet 202 where it contacts the surface 208S of the cover member 208 (shown by arrow 210 in FIG. 2B) (the sheet members 202 and 204 may be substantially transparent to the laser energy). The laser energy LB is substantially absorbed by the cover member 208 to thereby locally heat the cover member surface 208S at the incident laser beam location. This localized heating of the cover member 208 increases a temperature of the first polymeric sheet member 202 and then the second polymeric sheet member 204 (as shown by heat flow arrow 212) to thereby soften and/or melt the first and second polymeric sheet members 202 and 204 at the overlapped area at the localized location of the laser energy exposure. This softening and/or melting joins the first and second polymeric sheet members 202 and 204 together at the localized location of the laser energy exposure.

Other arrangements of the scanning equipment and the polymeric sheet portions to be joined are possible without departing from this invention. For example, the system 240 illustrated in FIG. 2C is similar to that illustrated and described above in conjunction with FIG. 2A, but in this example system 240, the heat absorbing base support 206, the polymeric sheets 202 and 204, and the securing member 208 (e.g., a glass cover, an open frame, etc.) are oriented vertically rather than horizontally. The overall heating process to join the polymeric sheets 202 and 204 (due to absorption of laser energy at the surface 206S of the heat absorbing base support 206 to heat polymeric sheet surface 204S and thus both polymeric sheets 202 and 204) works in generally the same manner as the heating process described above with respect to FIG. 2A.

FIG. 2D shows yet another example system 260 and method for joining polymeric materials (e.g., sheet materials 202 and 204) together. In this example system 260, the laser energy absorbing material 206A is applied as a thin coat (e.g., graphite paint, carbon black, etc.) on the surface 206S of an otherwise substantially laser energy transparent base support 206 (this type of thin coating on a base support 206 and/or a cover member 208 also could be used in the example systems described above in conjunction with FIGS. 2A through 2C). If desired, an infrared transparent or transmitting layer (e.g., glass) could be applied over the absorbing material 206A to avoid direct contact between the polymeric material 202 and the absorbent material 206A (and to avoid transfer of absorbent material 206A to the polymeric material 202, if that is a concern).

As shown in FIG. 2D, in this example system 260, the incident laser energy LB passes through the transparent portion of the support 206 to the underside of the thin laser absorbent coating 206A (see arrow 210 in FIG. 2D), where the energy is absorbed. This action locally heats the base support surface 206S at the incident laser beam location, which in turn increases the temperature of the second polymeric sheet member 204 (due to its surface 204S location adjacent the absorbent material 206A surface of the base support 206) and then the first polymeric sheet member 202 (as shown by heat flow arrow 212). This heating softens and/or melts the first and second polymeric sheet members 202 and 204 at the overlapped area at the localized location of the laser energy exposure and joins these sheet members 202 and 204 together at the localized location of the laser energy exposure. While shown with a generally vertical arrangement in FIG. 2D, this same type of laser exposure and heating technique also may be used in the more horizontal arrangements of FIGS. 2A and 2B.

While FIGS. 2A through 2D illustrate generally horizontal and vertical arrangements of the polymeric sheet members 202 and 204 to be joined, any other desired angular arrangements between horizontal and vertical also are possible without departing from this invention. Also, while the above description of FIGS. 2A through 2D describe joining two polymeric sheet portions together, if desired, systems and methods according to aspects of this invention may be used to join three or even more sheet portions together (e.g., by selecting appropriate laser scanning conditions (e.g., spot size, laser power, scanning speed, etc.), by selecting appropriate materials and materials properties (e.g., thicknesses, etc.), in a multistep process, and the like).

FIGS. 3 and 4 illustrate examples of laser scanning equipment that may be used to selectively join two or more polymeric sheet portions together. The reference numbers in FIGS. 3 and 4 correspond to those used in FIG. 2A, so the repetitive description of these parts is omitted. As further shown in FIG. 3, the system 200 includes a laser source 300 that emits a laser beam LB. A scanning system is provided to move the exposure location of the laser beam LB to the desired location(s) of the weld W. Any desired type of scanning system may be used without departing from this invention, including laser scanning systems as are conventionally known and commercially available. In the system 200 illustrated in FIG. 3, the scanning system includes two rotatable (or otherwise movable) mirrors 302A and 302B that may be moved independent of one another to expose any desired location within a two-dimensional field of view (FOV) of the scanning system (the desired location(s) for the weld W of the overlapping polymeric sheet members 202 and 204 must be located within the scanning system field of view in this system 200).

One advantageous feature of the laser beam based systems and methods according to the invention described above relates to the ability to locally apply the laser beam LB at specific areas of the materials 202 and 204 to be joined, which provides a great deal of flexibility in the constructions and appearances of the welds made. For example, as noted above, laser beams can be focused down to very small spot sizes, which allow very thin welds to be formed in the materials 202 and 204. Furthermore, laser scanning systems can very precisely and repeatably apply the laser beam to the desired locations (e.g., using lenses, mirrors, and other optics). By using the laser beam LB, the laser absorbent material of the support 206 and/or cover or securing member 208 can be heated in a very localized manner, thereby providing very precisely located (and not visually obtrusive) welds (e.g., thin, clean, and/or clear welds). Additionally, using the ability to control the laser's exposure locations (e.g., by switching the beam on and off, by shuttering the beam at the laser 300 output port, etc.), any desired weld patterns may be created. The ability to create very small and precise welds using a large area laser absorbent material support 206 or cover 208 is an advantage over the system described in U.S. Pat. No. 3,384,526 noted above.

The above noted advantageous features are further illustrated in the example system 200 shown in FIG. 4. The system 200 of FIG. 4 is similar to that shown in FIG. 3 except a selectively activatable shutter member 300S is shown at the laser output port 300P. By selectively shuttering and unshuttering the laser output port 300P, a discontinuous weld W can be produced, which further enhances the available patterns and designs of welds W that can be in accordance with this invention (e.g., FIG. 4 shows the weld W formed in a dash-dot pattern). The example of FIG. 4 also illustrates that the sheet members 202 and 204 need not be of the same size and/or be co-extensive (they only need to partially overlap at the desired weld location(s)).

Any desired types of products may be made including two (or more) welded polymeric materials without departing from this invention. As some more specific examples, such welded materials may be used in fluid-filled bladders (e.g., as used for impact attenuating elements for footwear; lightweight carry straps for golf bags, backpacks, or the like; packing material for shipping; etc.), medical supplies (e.g., packaging for liquid medications such as IV bags, packaging for sterile medical equipment and other medical supplies, etc.), food containers or packaging (e.g., chip bags), footwear uppers, garments, fabrics, etc. Also, the welded areas may structural in nature (e.g., to provide a fluid-tight connection for the various applications described above) and/or aesthetic in nature (e.g., to provide an interesting design or pattern, for example, on a footwear upper, clothing, apparel, fabrics, etc.).

Another advantageous feature of the laser based systems and methods according to at least some examples of this invention involves the ability to make very clean and clear appearing welds, even in transparent polymeric sheet or film materials (the term "sheet" as used herein, includes within its scope polymeric materials that may be classified as "films"). This can be accomplished because no laser absorbent dopant material or laser absorbent interface material (such as the CLEARWELD® near infrared absorbing material available from Gentex Corporation described above) needs to be applied to the surface of either polymeric member to be joined. Additionally, the time, trouble, and expense of including these materials also can be avoided using systems and methods according to at least some examples of this invention.

2. Broadband Heating Based Examples

While various examples of laser based systems and methods for joining two (or more) polymeric materials together are described above, other aspects of this invention involve joining two (or more) polymeric materials together using more general, broadband heat sources (e.g., like conventional ovens or other heaters). Various specific examples of such systems and methods are described in more detail below.

Figure 5A:
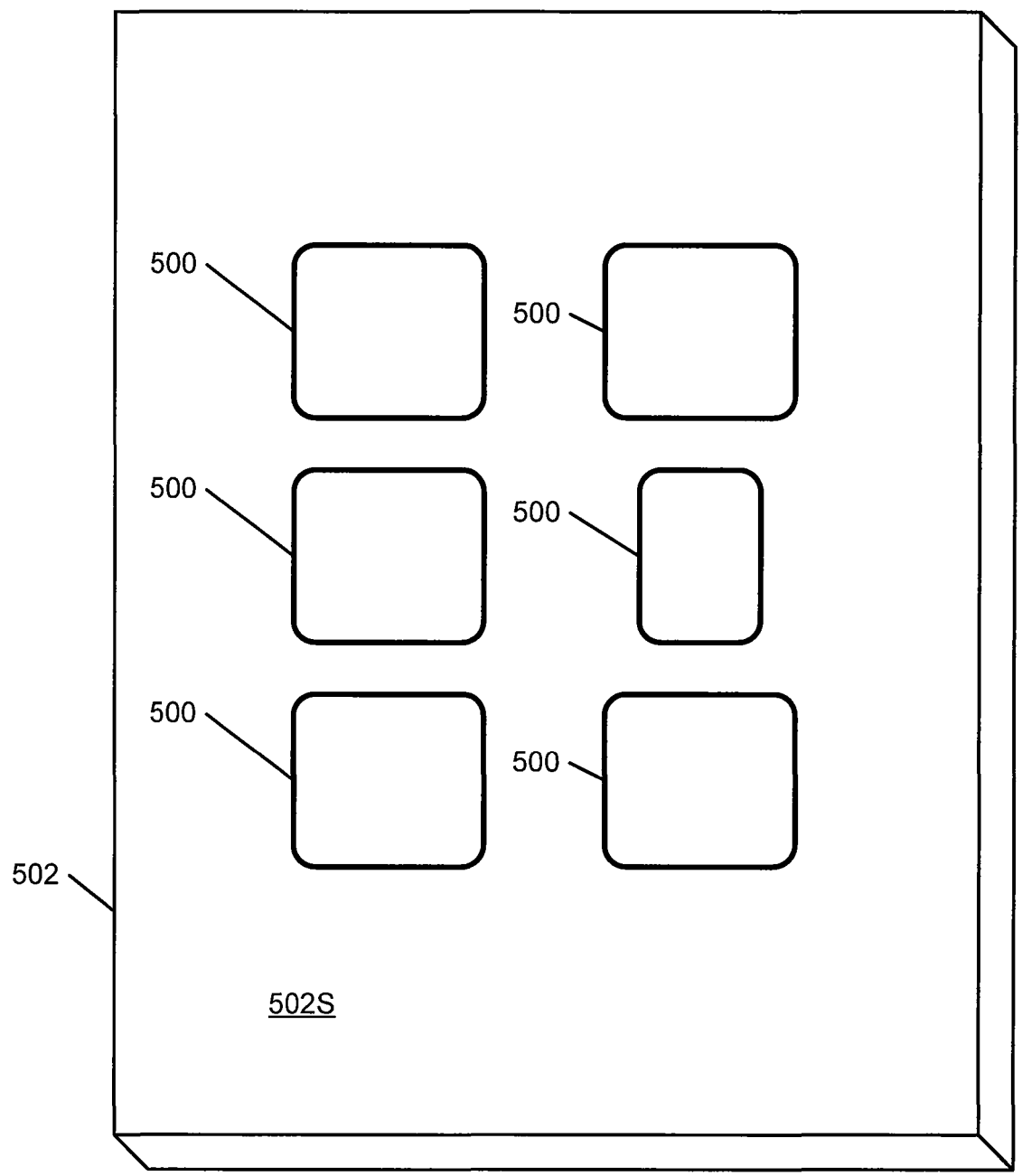
FIGS. 5A through 5D illustrate various example features of this invention in which infrared absorptive material is locally applied to a base support member.

FIGS. 5A through 5D illustrate one example system and method according to this aspect of the invention. This example system and method of joining polymeric materials includes an initial step of applying an infrared absorptive material 500 to at least one location, and in some examples, to a plurality of separated and discrete locations on a surface 502S of a base support member 502. The infrared absorptive material 500 is applied in the desired pattern of the welds, e.g., with controlled locations, dimensions, spacings, etc. As illustrated in FIG. 5A, the sizes, shapes, and/or patterns of the applied infrared absorptive materials 500 at the multiple locations may be the same or different without departing from this invention. As some more specific examples, the infrared absorptive material 500 may be permanently applied to the base support 502, e.g., in the form of graphite paint, carbon black, or other black coating composition, so the base support 502 can be used multiple times. Alternatively, if desired, the infrared absorptive material 500 may be temporarily applied to the base support 502 (e.g., removable by cleaning (optionally with solvents), by scraping, by an adhesive film, etc.), such as via a coating, gel, or other material (e.g., such as the CLEARWELD® near infrared absorbing material available from Gentex Corporation described above), so that different weld patterns can be applied to a single support 502 over time. If desired, the surface 502S may be covered with a heat transmissive material (e.g., quartz glass) so that direct contact between the absorptive material 500 and the material to be welded can be avoided.

The base support member 502 in at least some examples of this invention preferably will not be a strong absorber, reflector, and/or conductor of infrared radiation (at least over the wavelengths of the radiative heating source to be used and/or over the time frames involved in the heating step). Examples of suitable materials for the base support member 502 may include, for example, rubber, ceramic, or stone materials.

Figure 5B:
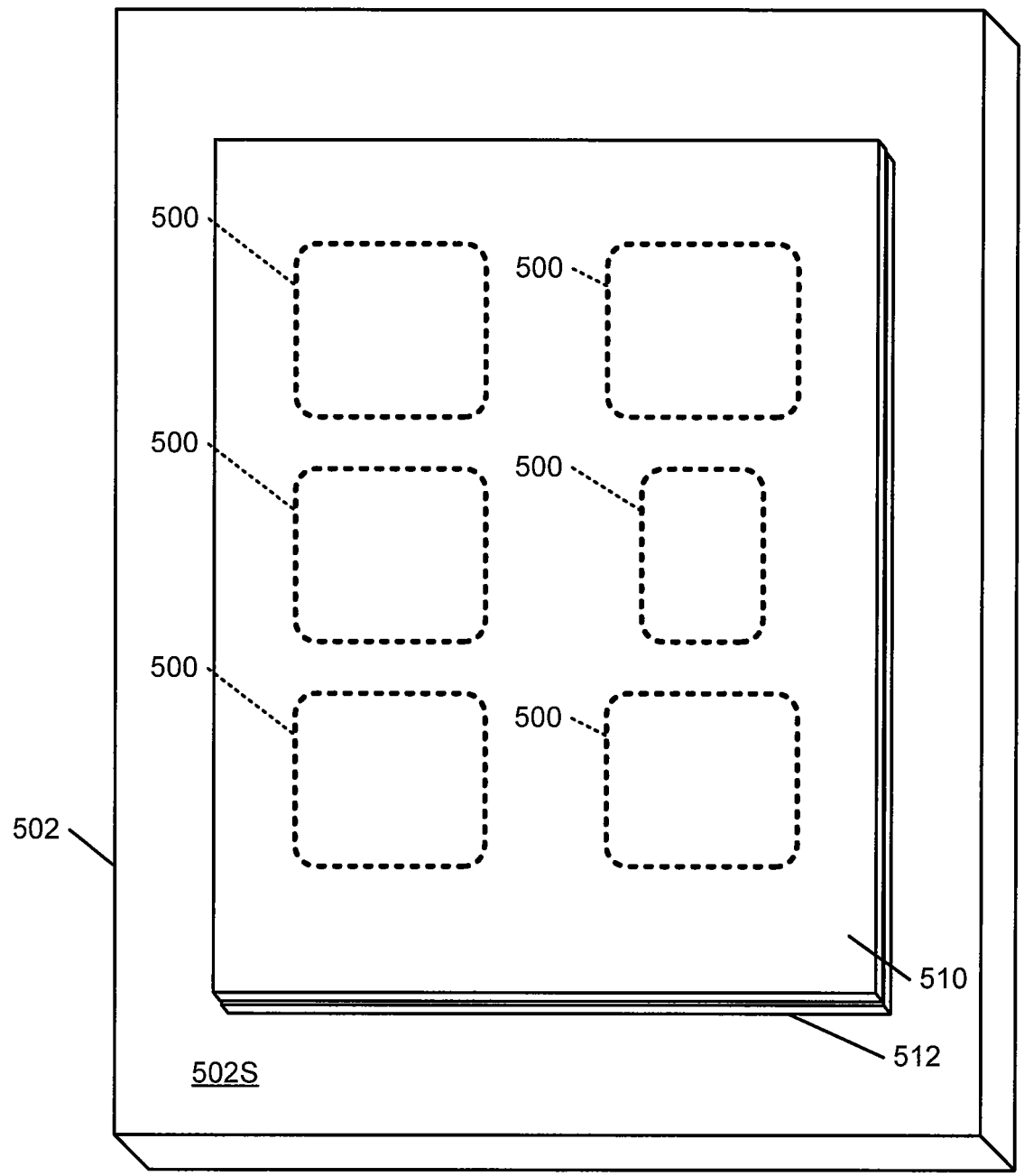
Figure 5C:
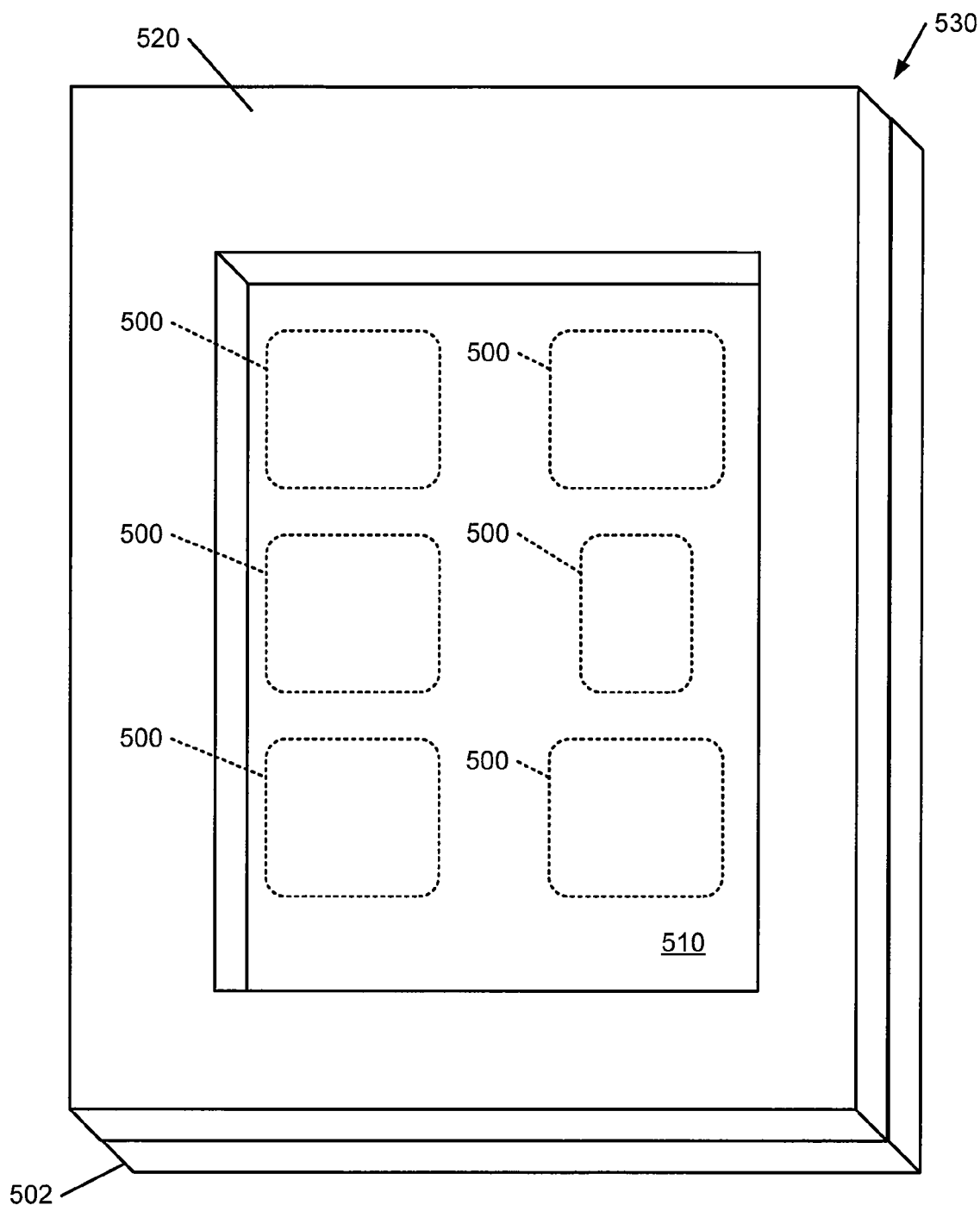

Then, as shown in FIG. 5B, a first polymeric sheet member 510 and a second polymeric sheet member 512 (which may be part of a single polymeric sheet) are arranged in an at least partially overlapping manner on the base support member 502 such that an overlapped area of the first and second polymeric sheet members 510 and 512 overlies at least some of the locations on the surface 502S of the base support member 502 at which the infrared absorptive material 500 has been applied. The sheet members 510 and 512, which may be made from the same or different materials (e.g., thermoplastic polyurethanes, polyethylenes, etc.), may be substantially transparent to infrared radiation. If necessary or desired, as illustrated in FIG. 5C, a frame member 520 with an open interior (or other securing system, such as a cover member, clamps, clips, adhesives, frames, nesting rings, mounting pins, etc.) may be used (e.g., optionally secured to the base support 502) to help hold the polymeric sheet members 510 and 512 in place with respect to one another and with respect to the base support 502. In this example, the frame member 520 or other securing system preferably will transmit the incident infrared energy without itself significantly heating the polymeric materials 510 and 512 (or at least without heating the polymeric materials 510 and 512 to a level near or above their melting and/or softening points).

Figure 5D:
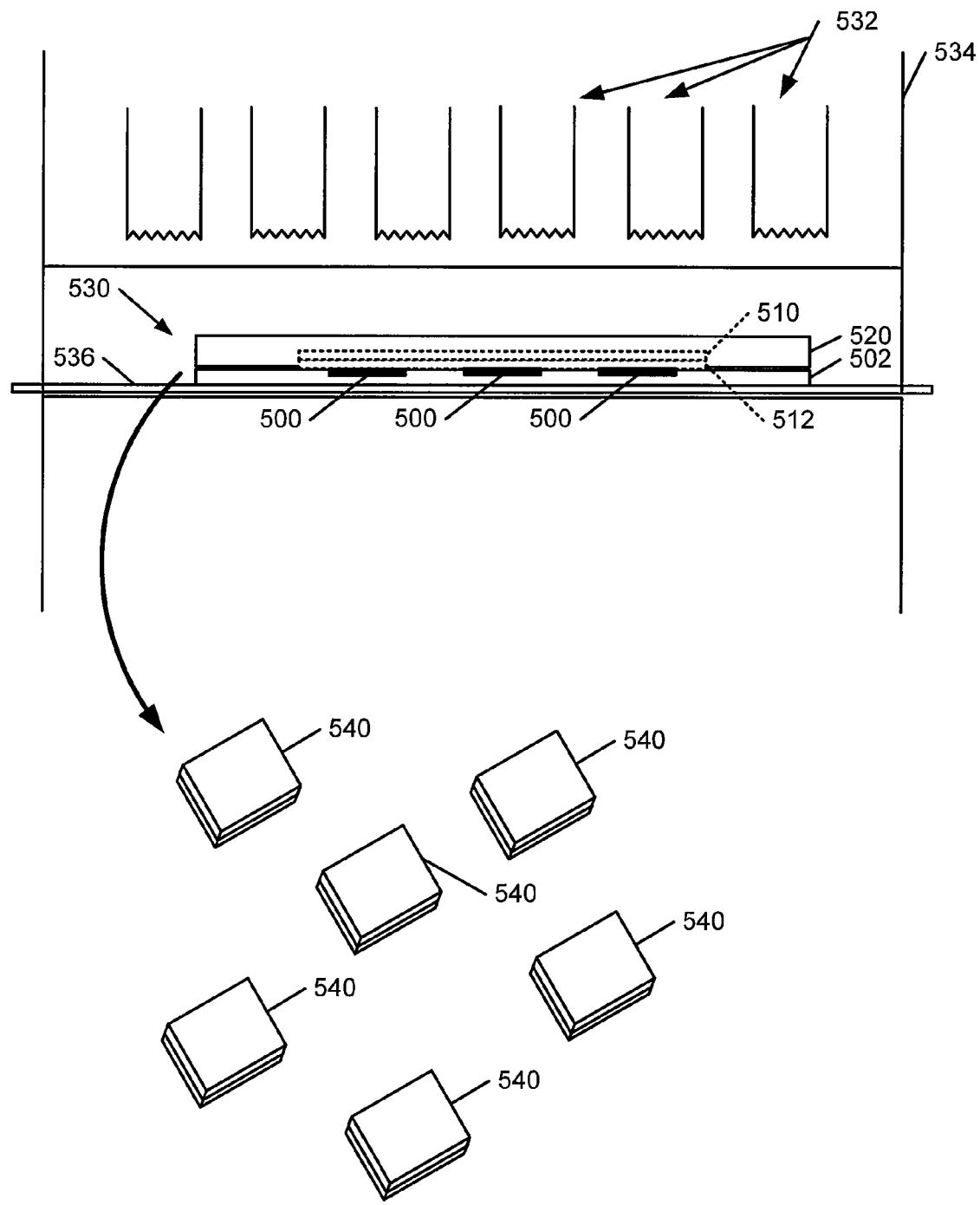

Then, as shown in FIG. 5D, the secured assembly 530 of FIG. 5C is exposed to broadband infrared energy (e.g., from one or more conventional heat lamps 532, in a conventional oven 534, etc.) for a sufficient time to join the first and second polymeric sheet members 510 and 512 together at locations adjacent to the infrared absorptive material 500 on the base support member 502. More specifically, in this example system and method, the infrared energy is substantially absorbed by the infrared absorptive material 500 (which may be provided at various separated and discrete locations) to thereby locally heat the first and second polymeric sheet members 510 and 512 at these locations (adjacent to locations of the infrared absorbent material 500). The heating of the polymeric sheet members 510 and 512 increases their temperatures at these localized areas to thereby soften and/or melt the polymeric sheet members 510 and 512 at the overlapped area and to thereby join them together at the overlapped area and not at the areas away from the location(s) that do not include infrared absorptive material.

The application of the infrared absorptive material 500 allows for significant differences in the surface temperature of the base support member 502 at locations of the infrared absorptive material 500 as compared to surface areas of the base support member 502 located away from the infrared absorptive material 500. In systems and methods according to this example of the invention, the infrared absorptive material 500 and the base support member 502 will be selected so as to have suitable thermal properties so that the infrared absorptivity at the location(s) of the infrared absorptive material 500 on the surface 502S of the base support member 502 will be increased as compared to an infrared absorptivity of the surface 502S of the base support member 502 at areas away from the locations that do not include infrared absorptive material 500. As some more concrete examples, the infrared absorptive material 500 and the base support member 502 in at least some example systems and methods according to this aspect of the invention will operate during the heating step such that a temperature at the surface 502S of the base support member 502 is at least 10% higher (and in some examples, at least 15% higher or even at least 20% or 25% higher) at the location(s) of the infrared absorptive material 500 as compared to the surface 502S temperature of the base support member 502 at locations at least 5 cm away from any infrared absorptive material 500 (these percent temperature differences are based on the temperature differences using the Celsius temperature scale). As another example, the infrared absorptive material 500 and the base support member 502 in at least some example systems and methods according to this aspect of the invention will operate during the heating step such that a temperature at the surface 502S of the base support member 502 is at least 10° C. higher (and in some examples, at least 15° C. higher or even at least 20° C. or 25° C. higher) at the location(s) of the infrared absorptive material 500 as compared to the surface 502S temperature of the base support member 502 at locations at least 5 cm away from any infrared absorptive material 500.

Once the heating step is completed and the polymeric materials 510 and 512 are joined, further processing can take place. For example, in the system shown in FIG. 5D, the joined polymeric sheets 510 and 512 can be cut, e.g., just outside the welds to produce multiple sealed, two (or more) layered polymeric products 540. As one example, these sealed, polymeric products 540 may be inflated with a fluid (e.g., air, nitrogen, other gases or liquids), re-sealed, and used as fluid-filled bladders, e.g., for footwear, straps, packing material, etc. Any desired product, including the various specific products mentioned above, also can be produced using this system and method according to this invention. Other possible post-welding processing steps include, but are not limited to: cleaning (e.g., to remove any adhered absorbent material 500), buffing, polishing, incorporation into another article of manufacture, etc.

In the example system shown in FIG. 5D, the assembly 530 to be welded is placed on a rack 536, tray, or other support for transfer into and out of the oven 534. Any desired manner of placing the assembly 530 into the oven 534 and/or moving it through the oven 534 may be used without departing from this invention. Alternatively, the rack 536 may be omitted. Other ways of moving such welding assemblies 530 through an oven 534 will be described in more detail below.

One advantageous aspect of this example system and method according to the invention relates to the fact that neither the first nor the second polymeric sheet member 510 or 512 needs to be treated or doped to increase an infrared energy absorption characteristic thereof. The first and/or second polymeric sheet members 510 and/or 512 also may be substantially transparent to radiation over the visible wavelength spectrum (or over at least a portion of the visible wavelength spectrum). Clean, precise, and well defined welds can be produced (e.g., based on the pattern of absorbent material 500 on the support surface 502S). Moreover, the base support 502 can be used repeatedly for high volume production of joined two layer articles 540 having the same pattern of absorbent material 500. Additionally or alternatively, if desired, the infrared absorptive material pattern on the base support member 502 may be changed by clearing off one pattern (e.g., by washing, scraping, sanding, etc.) and applying a different pattern.

Figure 6A:
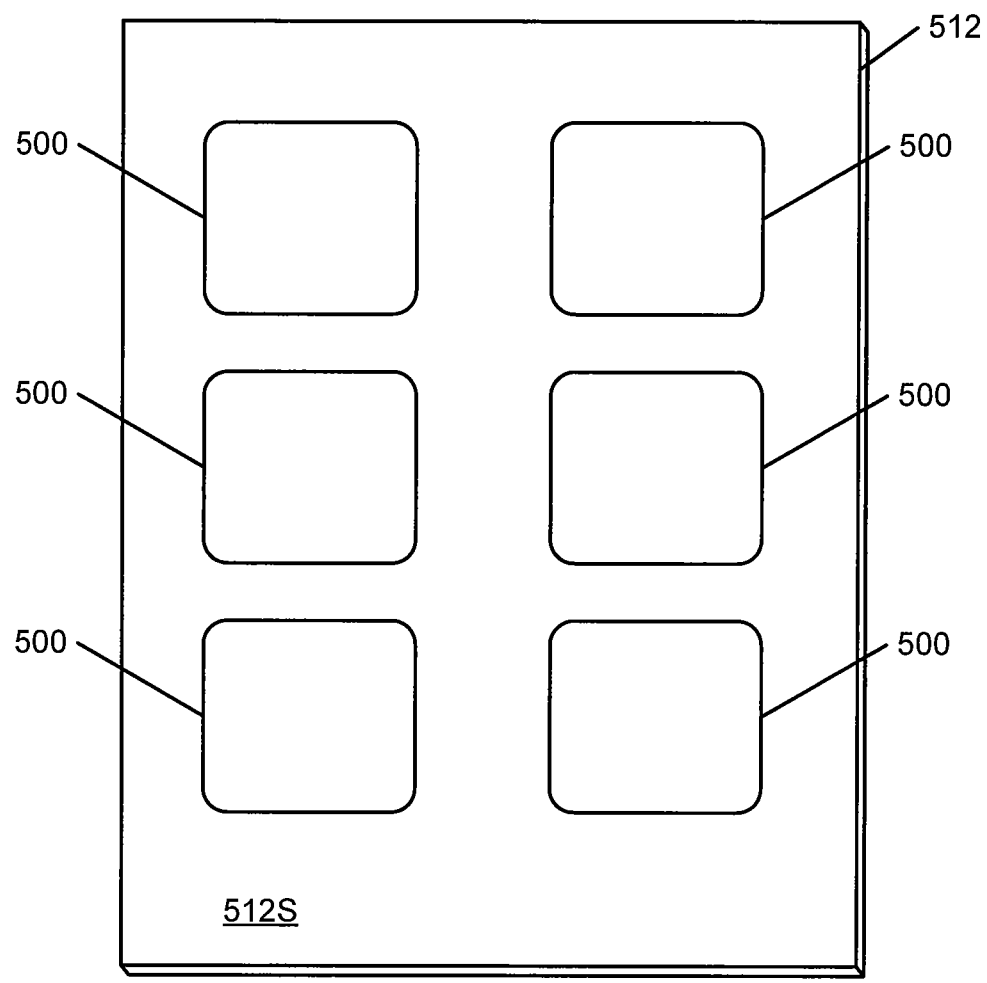
FIGS. 6A through 6D illustrate various example features of this invention in which infrared absorptive material is locally applied to an underside of one of the polymeric sheets.
Figure 6B:
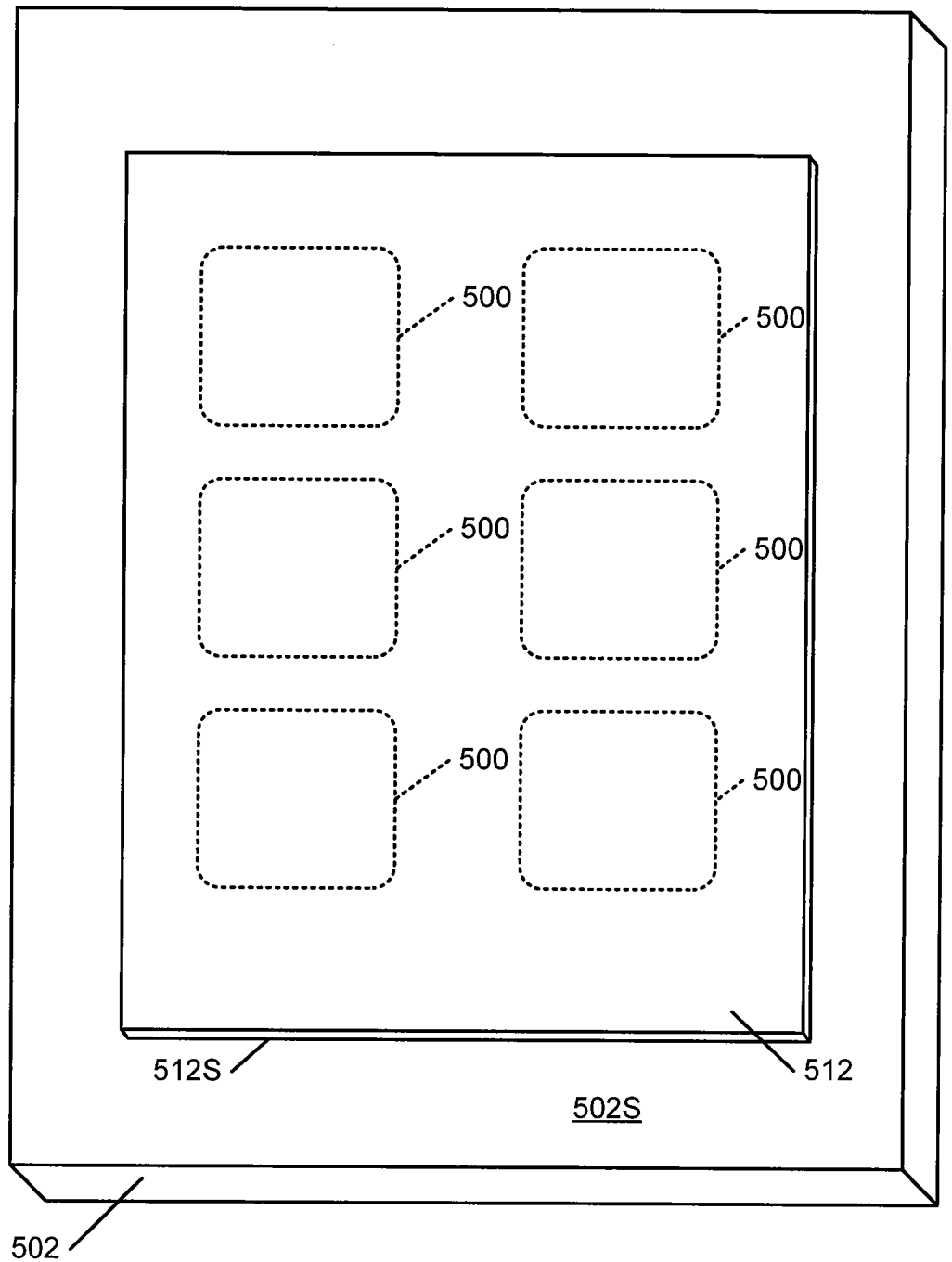

FIGS. 6A through 6D illustrate another example system and method for using broadband infrared energy to bond polymeric materials (e.g., two or more sheet members) together. Where the system and method of FIGS. 6A through 6D are similar to that described above for FIGS. 5A through 5D, the same reference numbers will be used and the repetitive description will be omitted. As shown in FIG. 6A, in this example, the infrared absorptive material 500 (e.g., carbon black, graphite, graphite paint, CLEARWELD® near infrared absorbing material available from Gentex Corporation described above, etc.) is placed directly on a major surface 512S of one of the polymeric sheet members 512 to be joined (e.g., by a printing, painting, silk-screening, or other coating or application method). This surface 512S is then placed adjacent the major surface 502S of base support 502, as shown in FIG. 6B (the infrared absorptive material 500 is shown in broken lines in FIG. 6B to indicate that it is on the bottom side of the sheet 512 in the orientation shown in FIG. 6B).

Figure 6C:
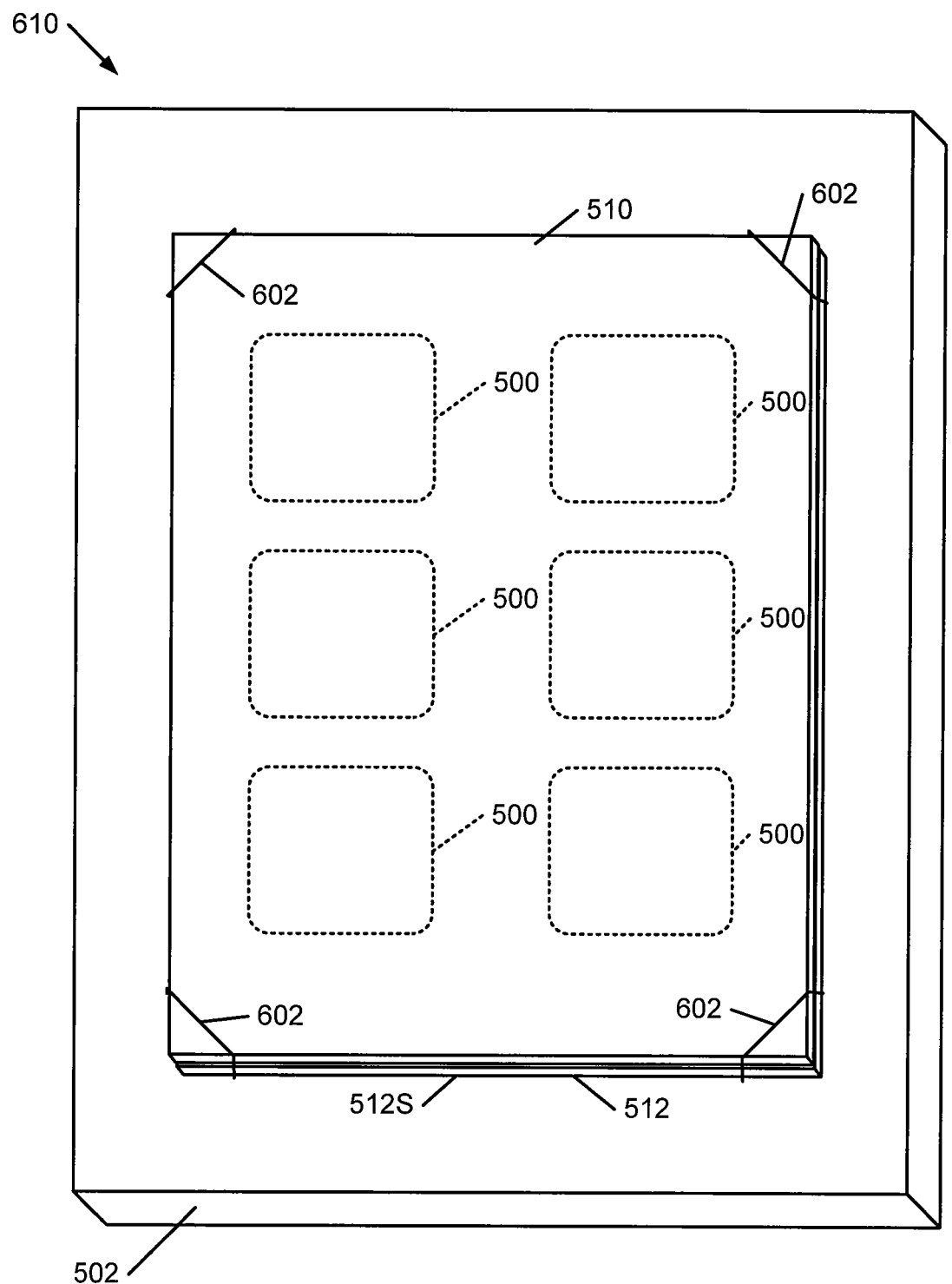

Then, as shown in FIG. 6C, the top polymeric sheet member 510 is placed in an at least partially overlapping manner on sheet member 512 (to which it is to be joined). In this example, clamps 602 are provided at the corners of the sheet members 510 and 512 to hold these members in place with respect to one another and with respect to the base support 502. Any desired number of such clamps 602 (and/or other securing systems) may be provided and used without departing from this invention.

Figure 6D:
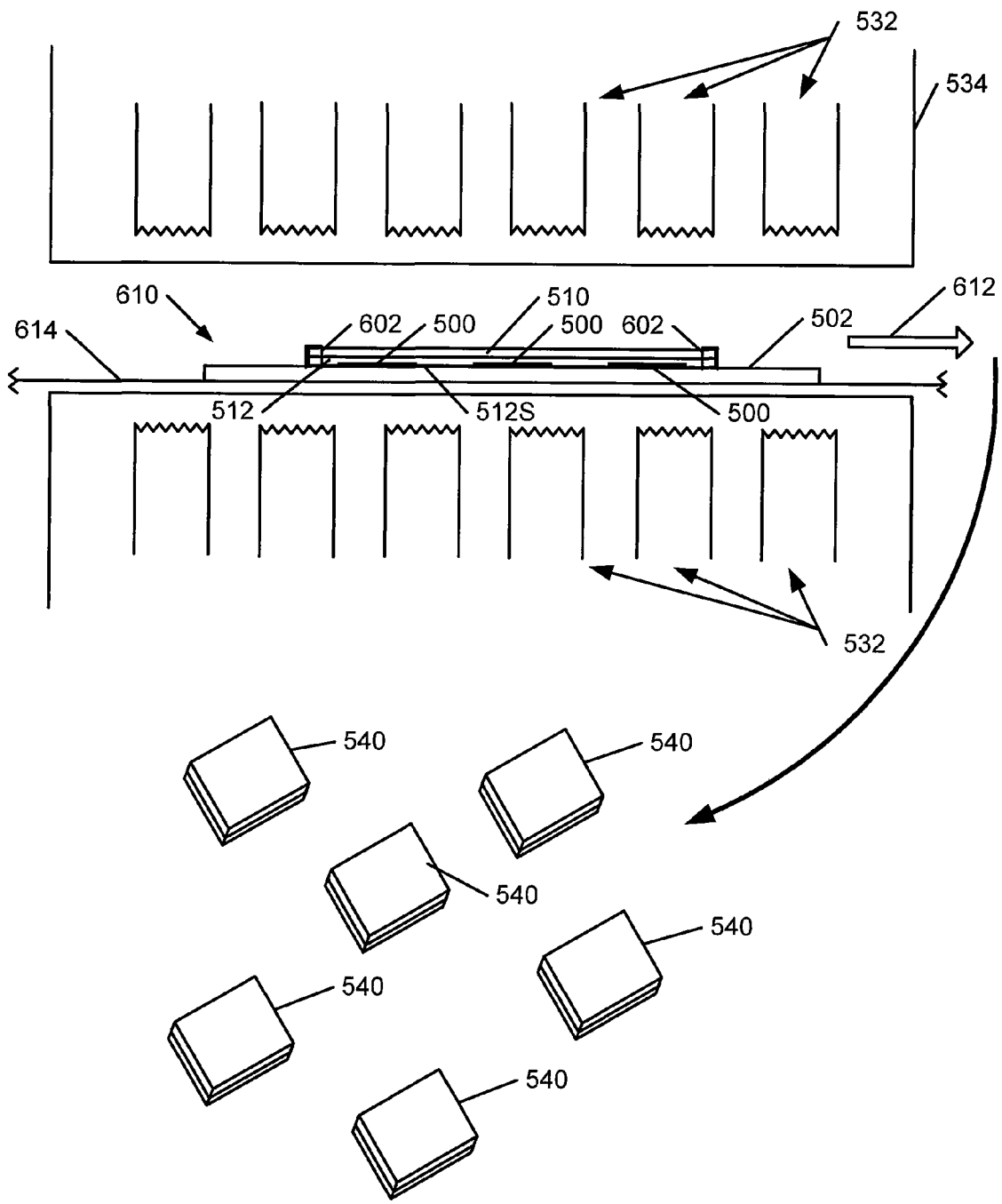

The heating step of this example is illustrated in FIG. 6D, which results in the polymeric sheet members 510 and 512 being joined together and enables production of the two-layered parts 540, e.g., as described above in conjunction with FIG. 5D. The presence of the infrared absorptive material 500 on the surface 512S of the sheet member 512 increases the infrared absorptivity at the location(s) of the infrared absorptive material 500 on the surface 512S of the sheet member 512 as compared to an infrared absorptivity of the surface 512S of the sheet member 512 at areas away from the infrared absorptive material 500. As some more concrete examples, during the heating step to join the two polymeric materials 510 and 512, a temperature at the surface 512S of the sheet member 512 will be at least 10% higher (and in some examples, at least 15% higher or even at least 20% or 25% higher) at the location(s) of the infrared absorptive material 500 as compared to the temperature of the surface 512S of the sheet member 512 at locations at least 5 cm away from any infrared absorptive material 500 (these percent temperature differences are based on the temperature differences using the Celsius temperature scale). As another example, during the heating step, a temperature at the surface 512S of the sheet member 512 is at least 10° C. higher (and in some examples, at least 15° C. higher or even at least 20° C. or 25° C. higher) at the location(s) of the infrared absorptive material 500 as compared to the temperature of the surface 512S of the sheet member 512 at locations at least 5 cm away from any infrared absorptive material 500.

In the example system illustrated in FIG. 6D, the assembly 610 to be welded (from FIG. 6C) is moved into and out of the oven 534 (as illustrated by arrow 612) on a conveyance system 614 (e.g., a conveyor belt, a rotary tray, etc.). The assembly 610 may move continuously through the oven 534, or it may move in a stepped or discontinuous manner.

Because the infrared-absorptive material 500 is applied to the exterior surface of the sheet member 512, if desired, one of the post-heating process steps may include cleaning or otherwise removing any residual infrared-absorptive material 500 from the surface(s) of the two-layered part 540. Such steps may include washing (including with solvents), buffing, polishing, scraping, sanding, etc.

Figure 7A:
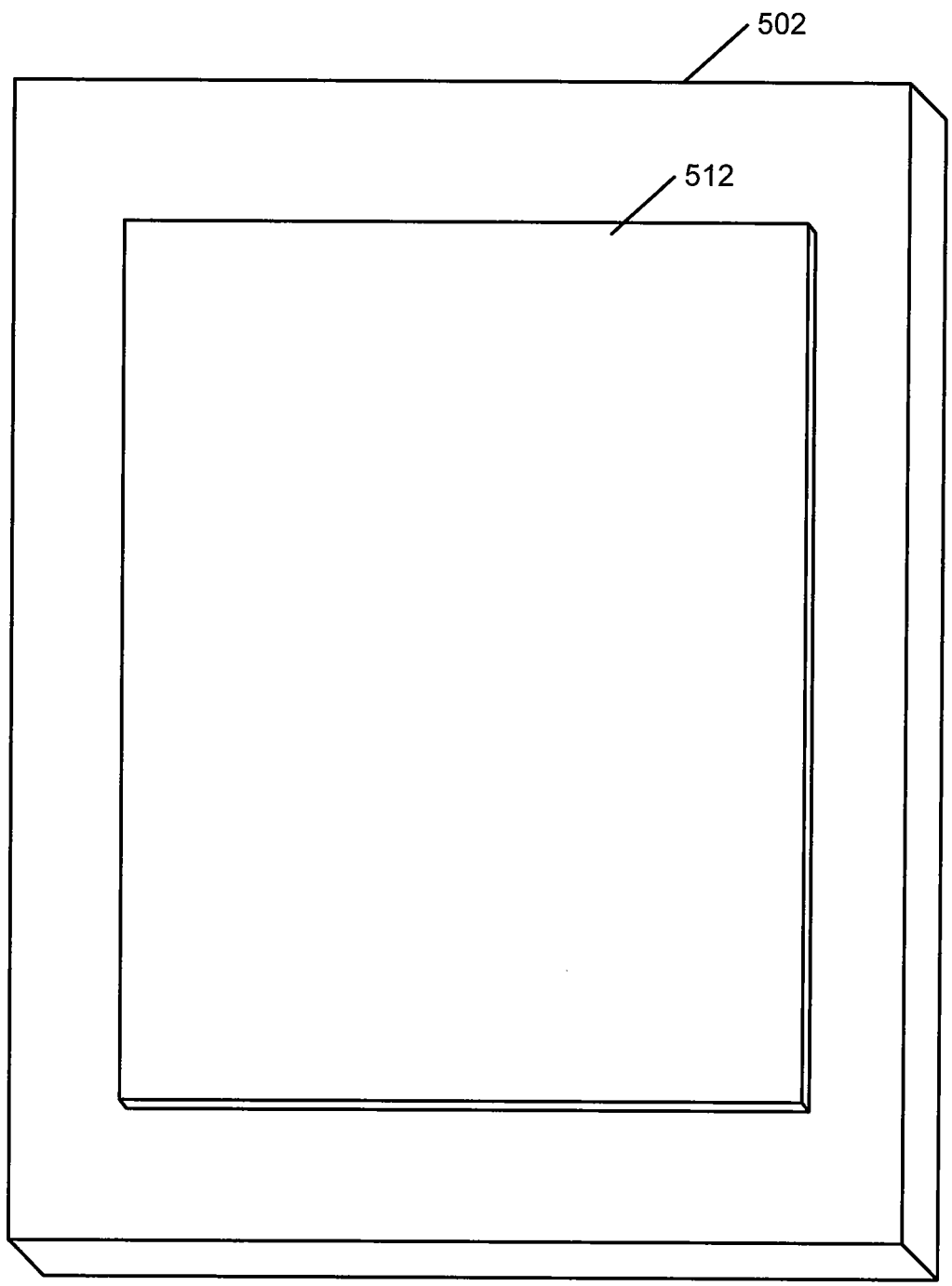
FIGS. 7A through 7D illustrate various example features of this invention in which infrared absorptive material is locally applied to a surface of one of the polymeric sheets that lies adjacent the other polymeric sheet.
Figure 7B:
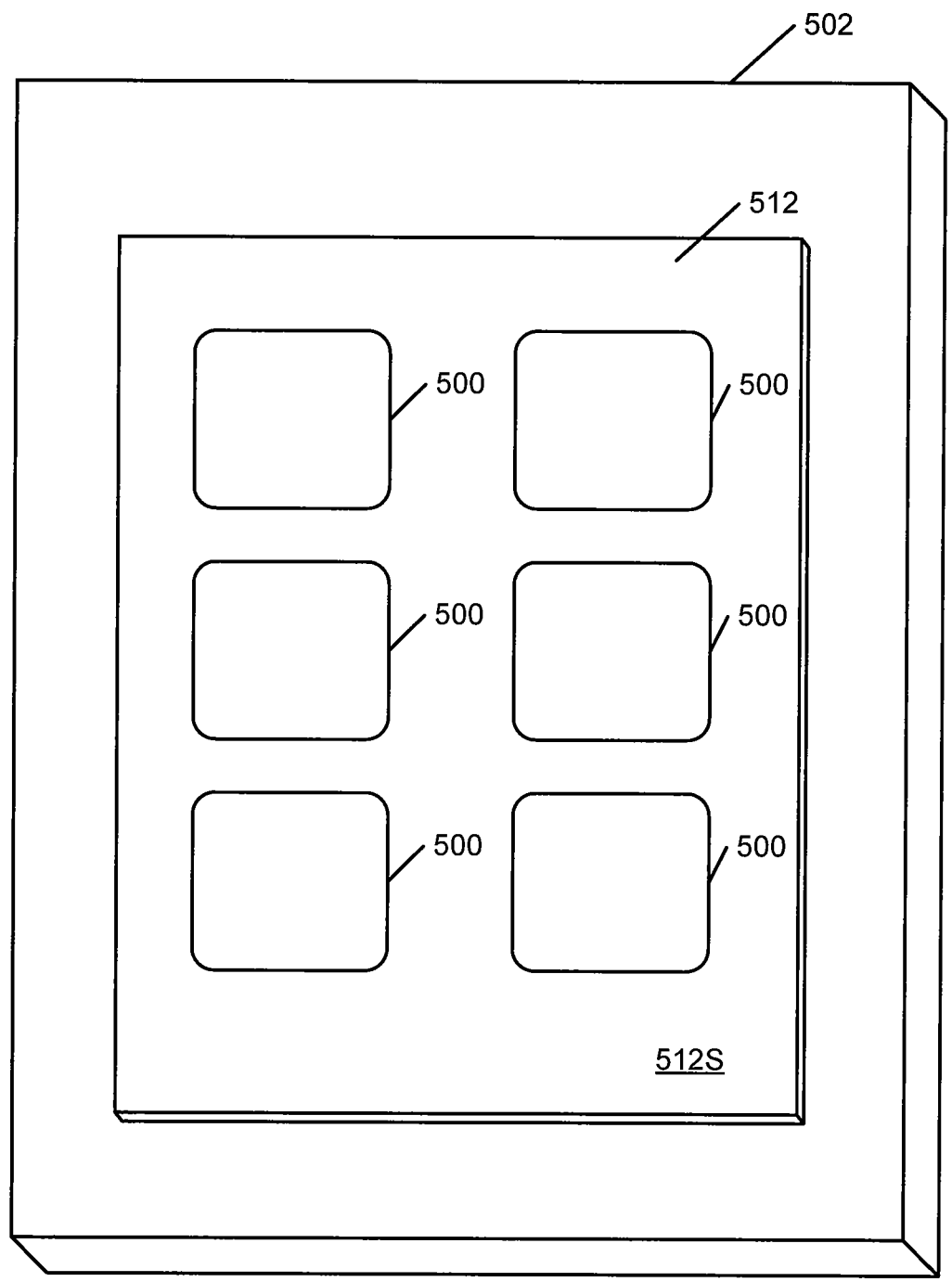

FIGS. 7A through 7D illustrate another example system and method for using broadband infrared energy to bond polymeric materials (e.g., two or more sheet members) together. Where the system and method of FIGS. 7A through 7D are similar to those described above for FIGS. 5A through 6D, the same reference numbers will be used and the repetitive description will be omitted. As shown in FIG. 7A, in this example, first the lower sheet member 512 is placed on the base support member 502. Then, as shown in FIG. 7B, an infrared absorptive material 500 (e.g., carbon black, graphite, graphite paint, CLEARWELD® near infrared absorbing material available from Gentex Corporation described above, etc.) is placed directly on a top major surface 512S of this lower polymeric sheet members 512. If desired, at least some of the absorptive material 500 may be placed on the sheet surface 512S prior to the sheet 512 being mounted on the support member 502 (e.g., by a printing, painting, silk-screening, or other coating or application method).

Figure 7C:
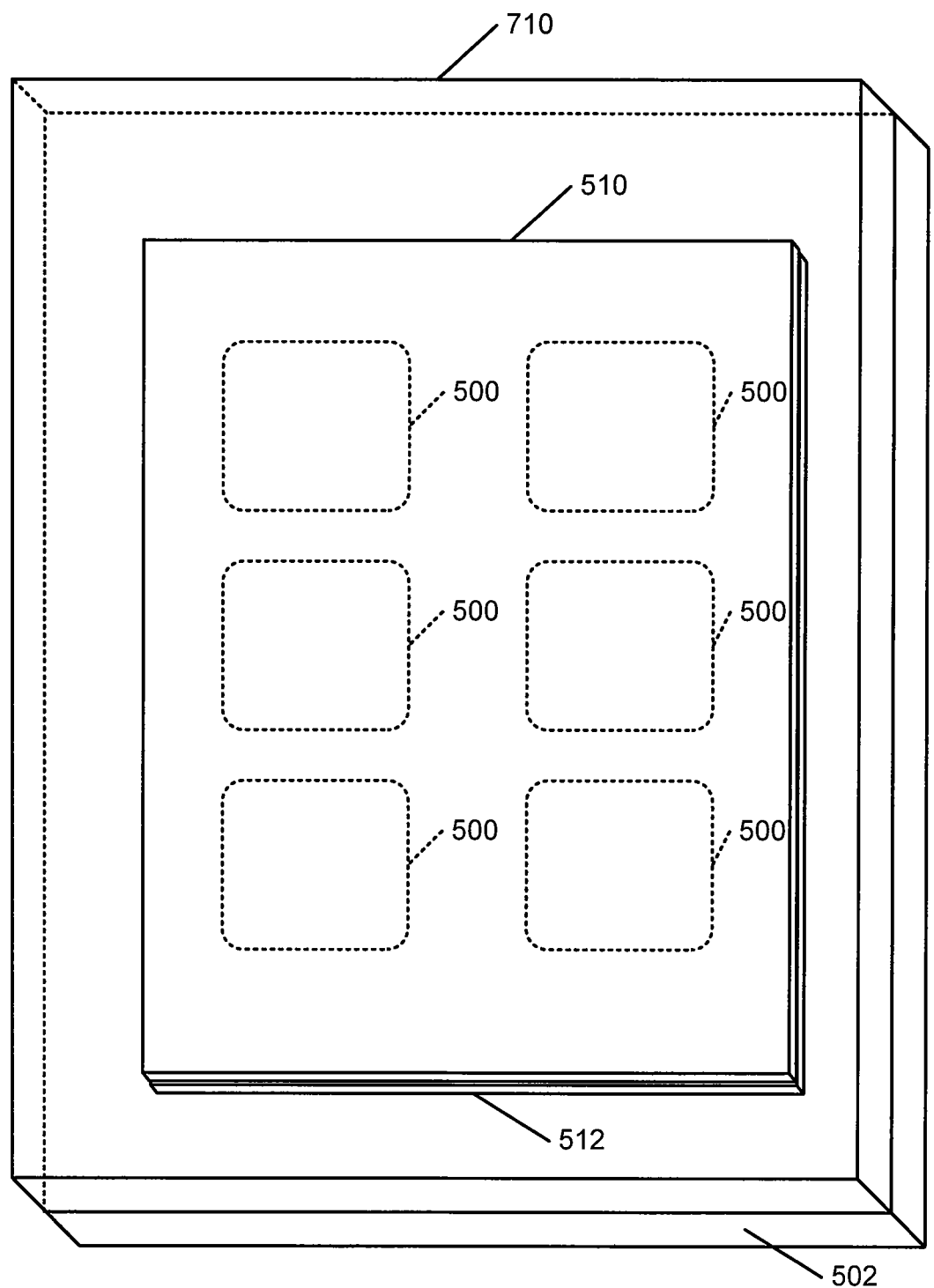

Then, as shown in FIG. 7C, the top polymeric sheet member 510 is placed in an at least partially overlapping manner on sheet member 512 (to which it is to be joined). In this manner, the infrared absorptive material 500 is located at the interface between sheet members 510 and 512. Then, the sheet members 510 and 512 may be secured together with respect to one another and with respect to the base support member 502. While any manner of securing may be used without departing from this invention, in this example, a cover plate 710 (e.g., made of quartz glass or other infrared transmissive material) may be used to secure the overall assembly in place. Alternatively, if desired, the infrared absorptive material 500 could be provided on the interior surface of the top sheet member 510 (or, if desired, both sheet members 510 and 512 could include some of the infrared absorptive materials 500).

Figure 7D:
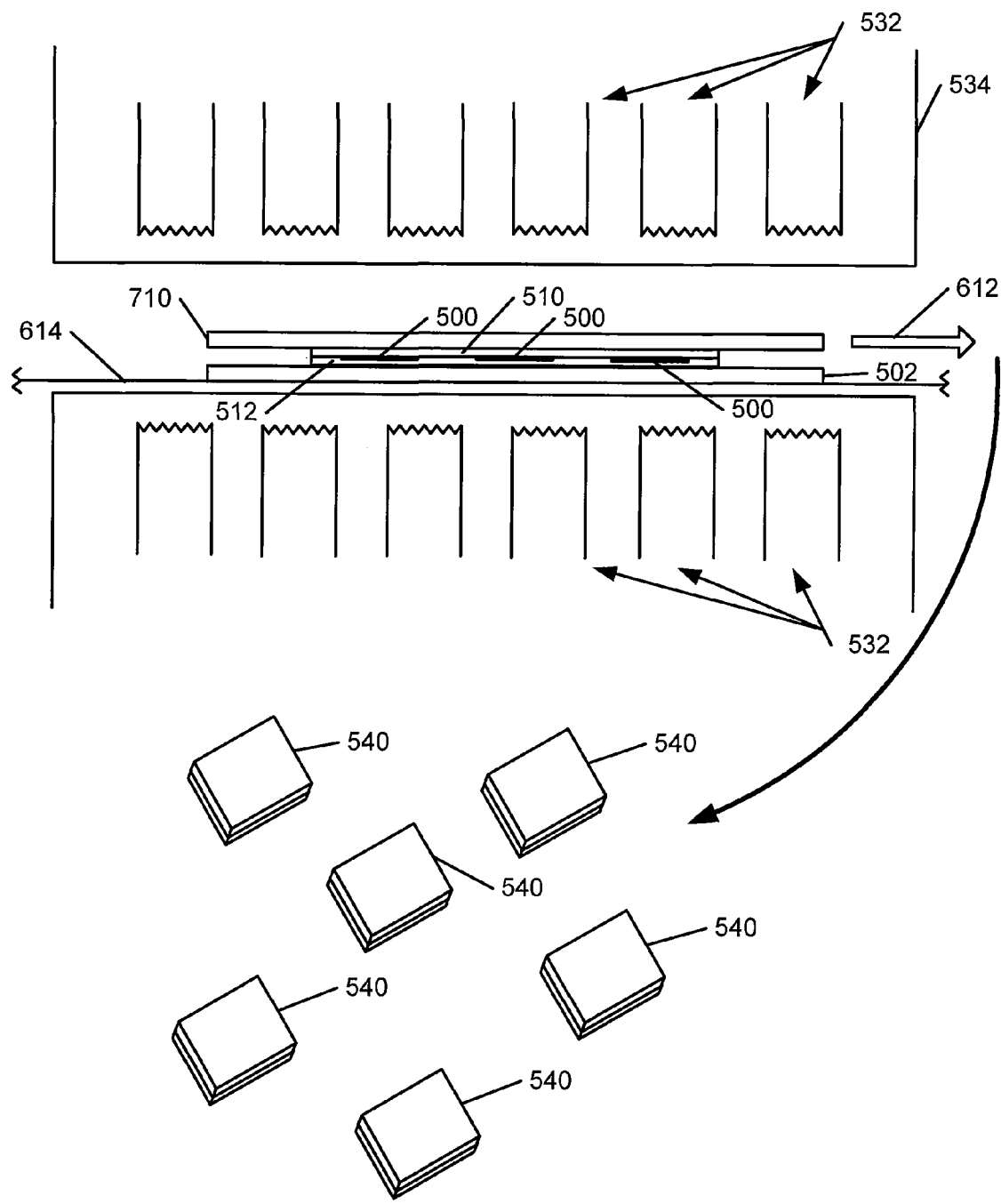

The heating step is illustrated in FIG. 7D, during which the polymeric sheet members 510 and 512 are joined together, and this procedure enables production of the two-layered parts 540, e.g., as described above in conjunction with FIG. 5D. The presence of the infrared absorptive material 500 at the interface between the two sheets 510 and 512 to be joined increases the infrared absorptivity at the location(s) of the infrared absorptive material 500 as compared to an infrared absorptivity at that interface at areas away from the infrared absorptive material 500. As some more concrete examples, during the heating step to join the two polymeric materials 510 and 512, a temperature at the interface between the two sheets 510 and 512 will be at least 10% higher (and in some examples, at least 15% higher or even at least 20% or 25% higher) at the location(s) of the infrared absorptive material 500 as compared to the temperature at the interface between the two sheets 510 and 512 at locations at least 5 cm away from any infrared absorptive material 500 (these percent temperature differences are based on the temperature differences using the Celsius temperature scale). As another example, during the heating step, a temperature at the interface between the two sheets 510 and 512 is at least 10° C. higher (and in some examples, at least 15° C. higher or even at least 20° C. or 25° C. higher) at the location(s) of the infrared absorptive material 500 as compared to the temperature at the interface between the two sheets 510 and 512 at locations at least 5 cm away from any infrared absorptive material 500.

Because the infrared-absorptive material 500 is applied at the interface between the sheet members 510 and 512, it may not be possible to remove any residual infrared-absorptive material 500 from the two-layered part 540, unless the part 540 includes at least one opening or gap in the weld. Nonetheless, the continuing presence of the infrared absorptive material 500 may not be a problem in all circumstances or for all products (e.g., for translucent or opaque polymeric materials, for products that are concealed in use, etc.).

Figure 8A:
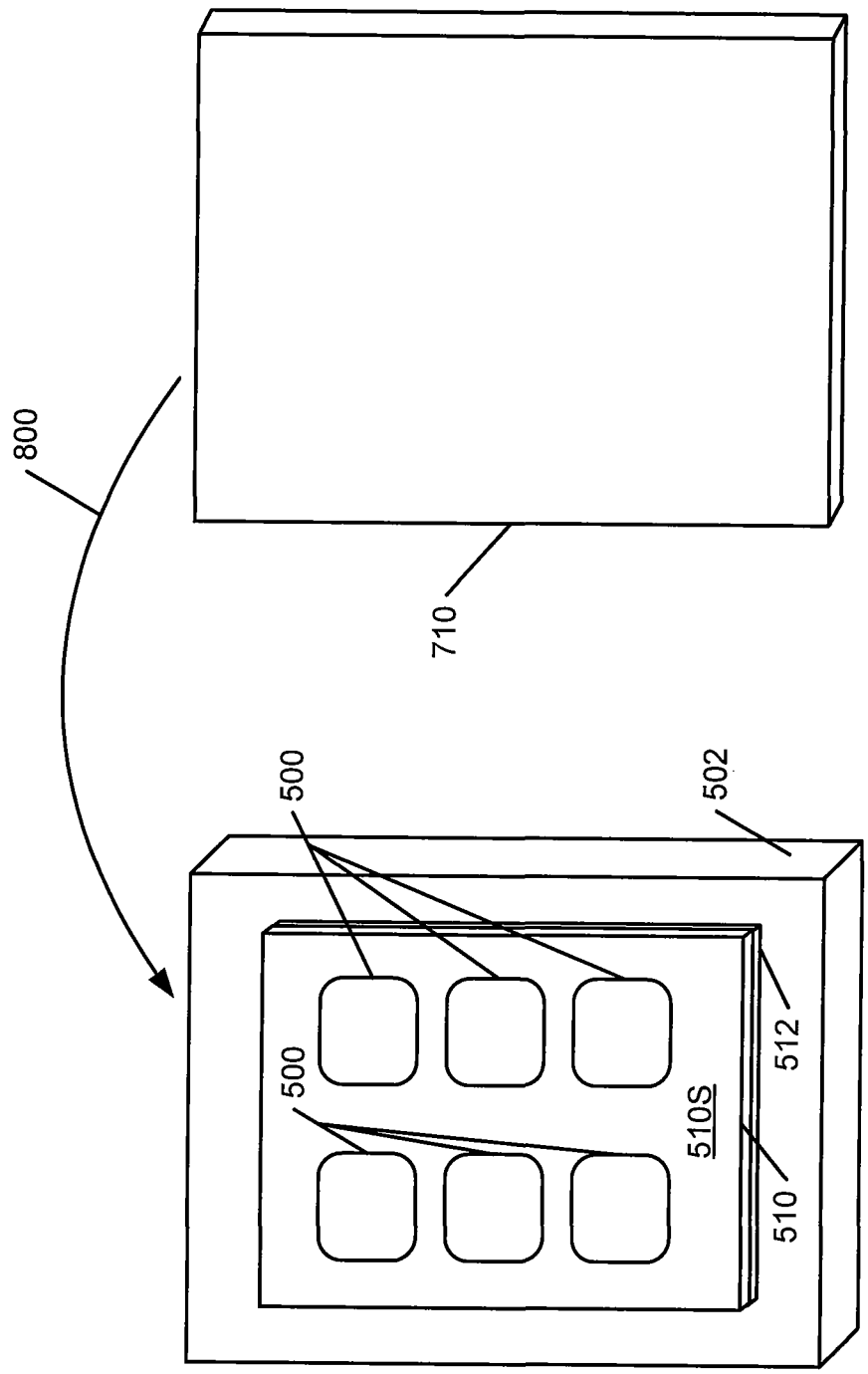
FIGS. 8A through 8C illustrate various example features of this invention in which infrared absorptive material is locally applied to a surface of one of the polymeric sheets that lies adjacent a cover or other securing member.
Figure 8B:
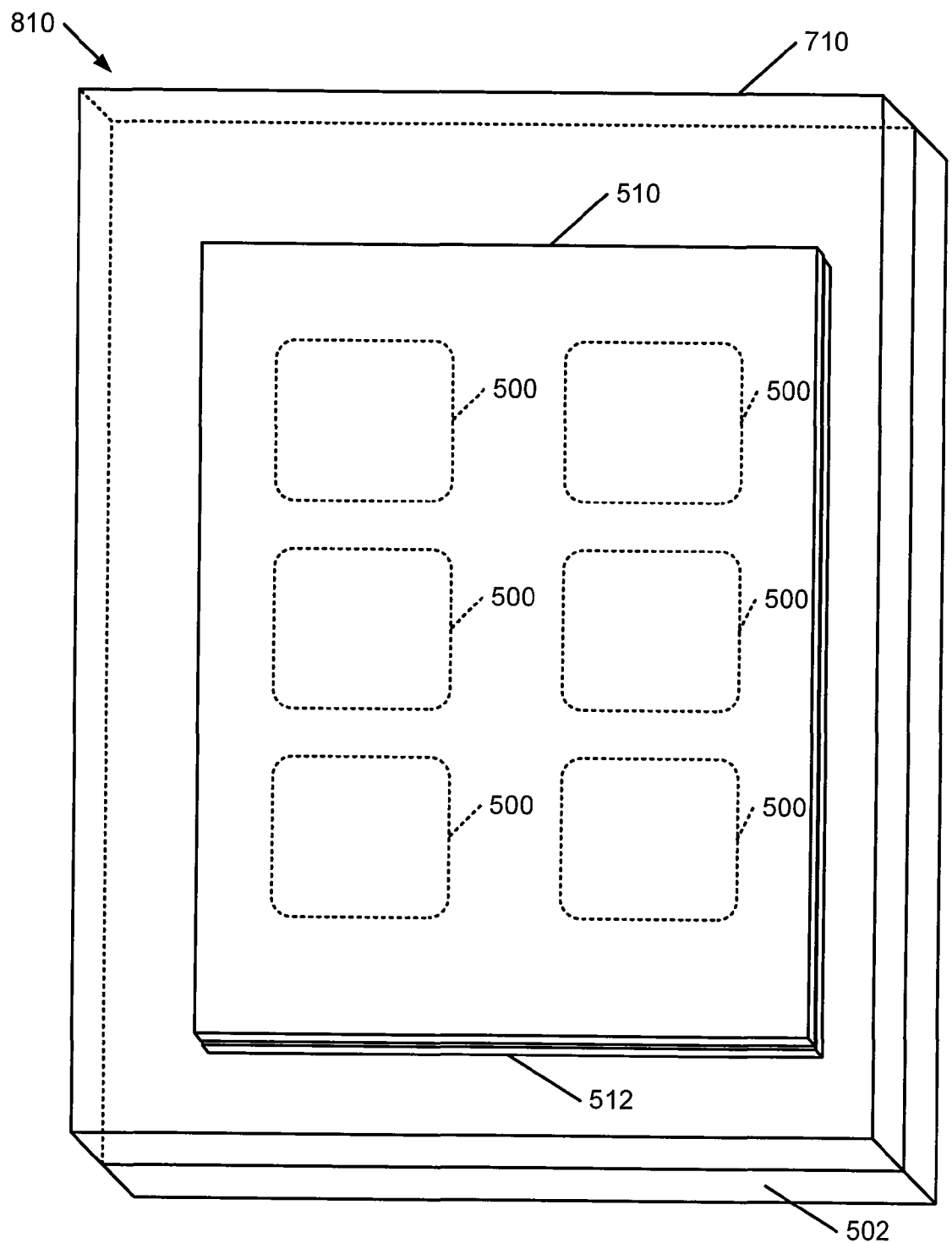
Figure 8C:
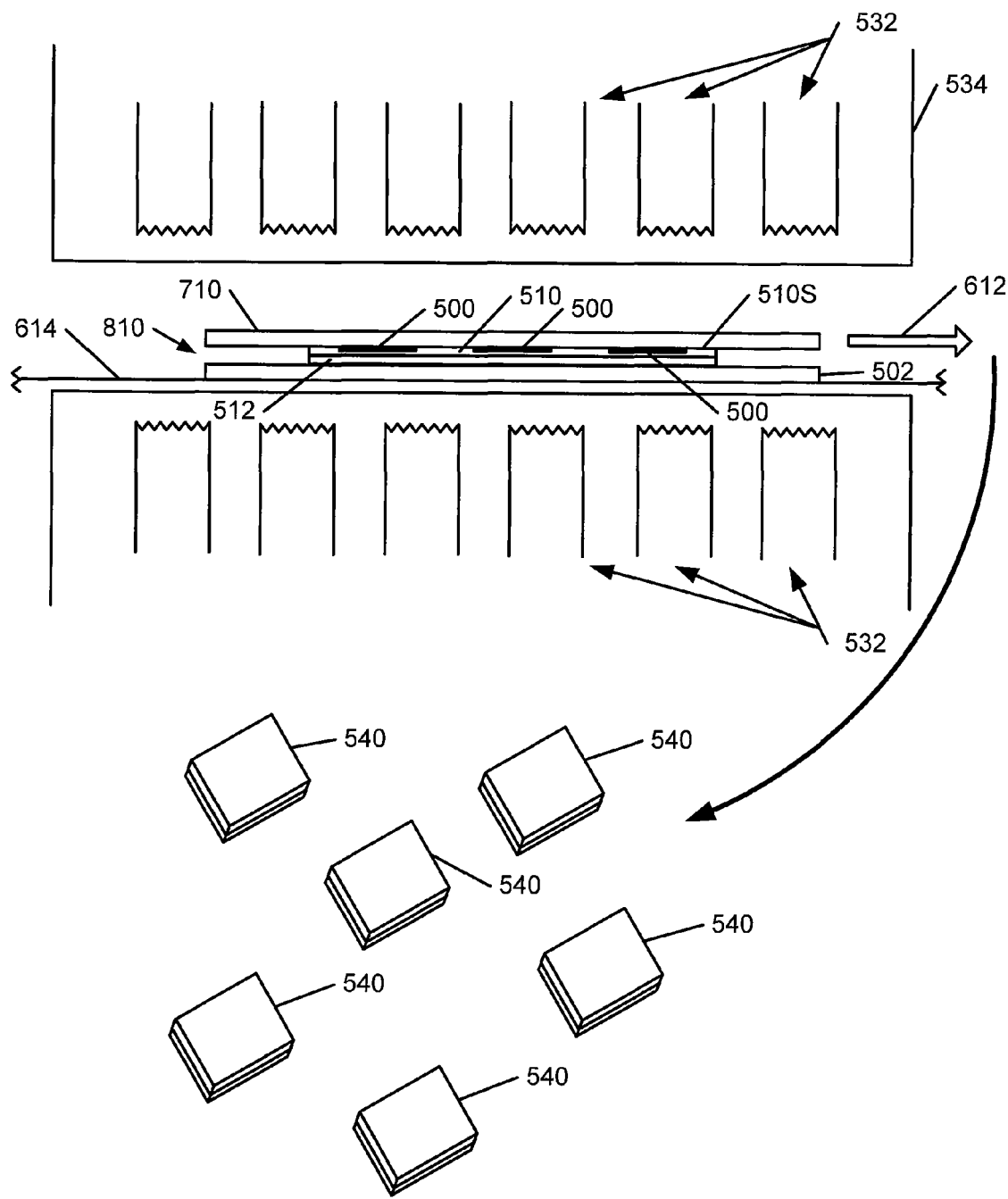

Another example broadband heating system and method in accordance with this invention is shown in FIGS. 8A through 8C. Where the system and method of FIGS. 8A through 8C are similar to those described above for FIGS. 5A through 7D, the same reference numbers will be used and the repetitive description will be omitted. The example system of FIGS. 8A through 8C is somewhat the opposite of the system of FIGS. 6A through 6D. As shown in FIG. 8A, in this example system, first the two sheet members 510 and 512 to be joined are mounted on the base support member 502 in an at least partially overlapping manner. Either before mounting on the support member 502 or after mounting on the support member 502, the exposed exterior surface 510S of the upper sheet member 510 is treated to include the infrared absorptive material 500 thereon in the desired weld pattern. The infrared absorptive material 500 may be applied to the surface 510S of the upper sheet member 510 in any desired manner, including in any of the various manners described above, using any of the various materials described above (e.g., by a printing, painting, silk-screening, or other coating or application method).

Once positioned on the base support member 502, the sheet members 510 and 512 may be held in place with respect to one another and with respect to the base support member, for example, by applying a cover member 710, e.g., of the various types described above. This securing step is shown in FIG. 8A by arrow 800, and the resultant assembly 810 for heat welding is shown in FIG. 8B. The infrared absorptive material 500 is shown in broken lines in FIG. 8B to indicate that it lies underneath the cover member 710.

Then, as shown in FIG. 8C, the assembly 810 for heat welding may be heated in oven 534 (or other desired broadband heat source), which joins the polymeric sheet members 510 and 512 together and enables production of the two-layered parts 540, e.g., as described above. While the example system illustrated in FIG. 8C has the assembly 810 to be welded moving into and out of the oven 534 (as illustrated by arrow 612) on a conveyance system 614, other ways of introducing the assembly 810 into the oven 534 may be used without departing from this invention, including the manners described above in conjunction with FIG. 5D.

The presence of the infrared absorptive material 500 on the surface 510S of the sheet member 510 increases the infrared absorptivity at the location(s) of the infrared absorptive material 500 on the surface 510S of the sheet member 510 as compared to an infrared absorptivity of the surface 510S of the sheet member 510 at areas away from the infrared absorptive material 500. As some more concrete examples, during the heating step to join the two polymeric materials 510 and 512, a temperature at the surface 510S of the sheet member 510 will be at least 10% higher (and in some examples, at least 15% higher or even at least 20% or 25% higher) at the location(s) of the infrared absorptive material 500 as compared to the temperature of the surface 510S of the sheet member 510 at locations at least 5 cm away from any infrared absorptive material 500 (these percent temperature differences are based on the temperature differences using the Celsius temperature scale). As another example, during the heating step, a temperature at the surface 510S of the sheet member 510 is at least 10° C. higher (and in some examples, at least 15° C. higher or even at least 20° C. or 25° C. higher) at the location(s) of the infrared absorptive material 500 as compared to the temperature of the surface 510S of the sheet member 510 at locations at least 5 cm away from any infrared absorptive material 500.

Because the infrared-absorptive material 500 is applied to the exterior surface 510S of the sheet member 510, if desired, one of the post-heating process steps may include cleaning or otherwise removing any residual infrared-absorptive material 500 from the surface(s) of the two-layered part 540. Such steps may include washing (including with solvents), buffing, polishing, scraping, sanding, etc.

Figure 9A:
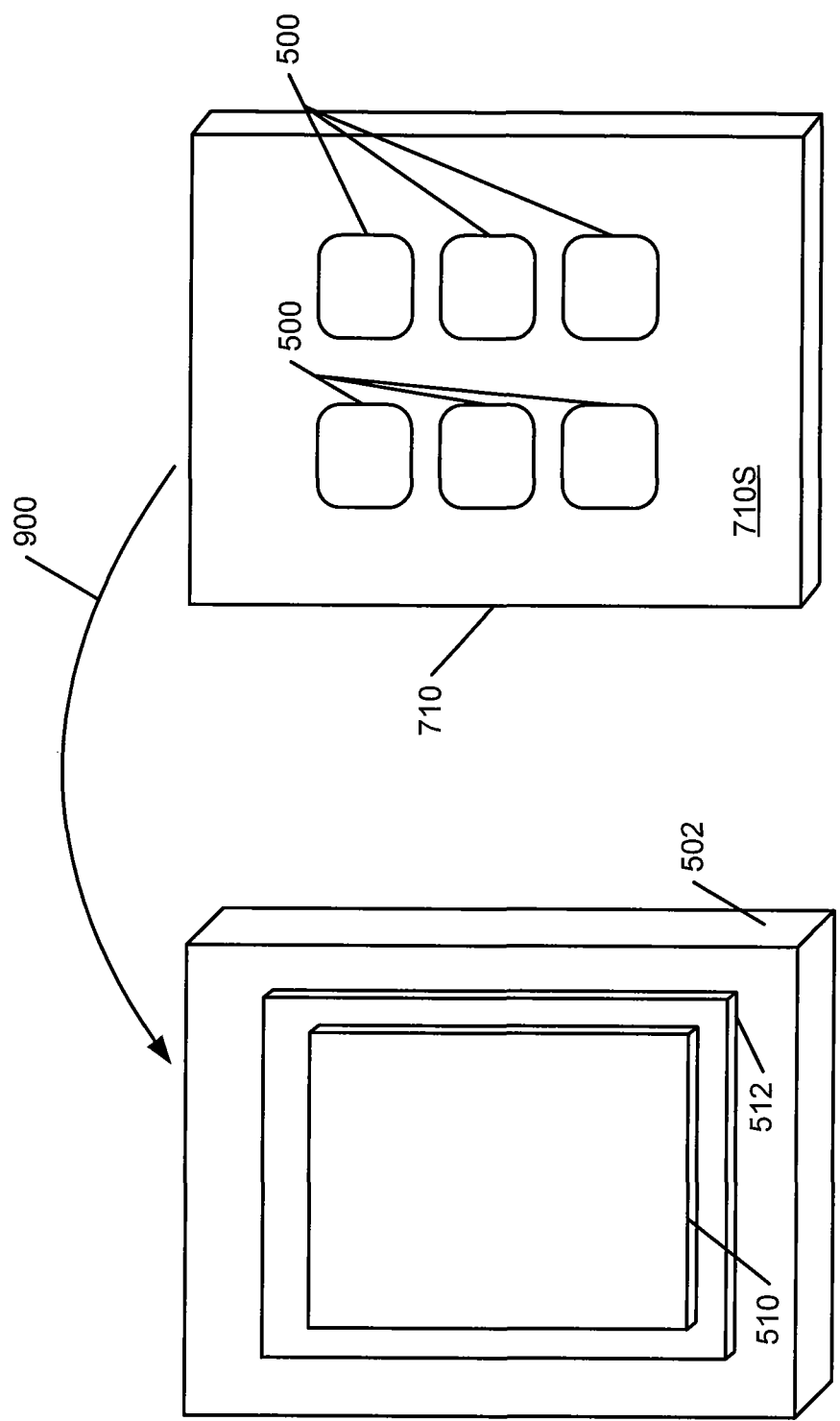
FIGS. 9A through 9C illustrate various example features of this invention in which infrared absorptive material is locally applied to a cover or other securing member.
Figure 9B:
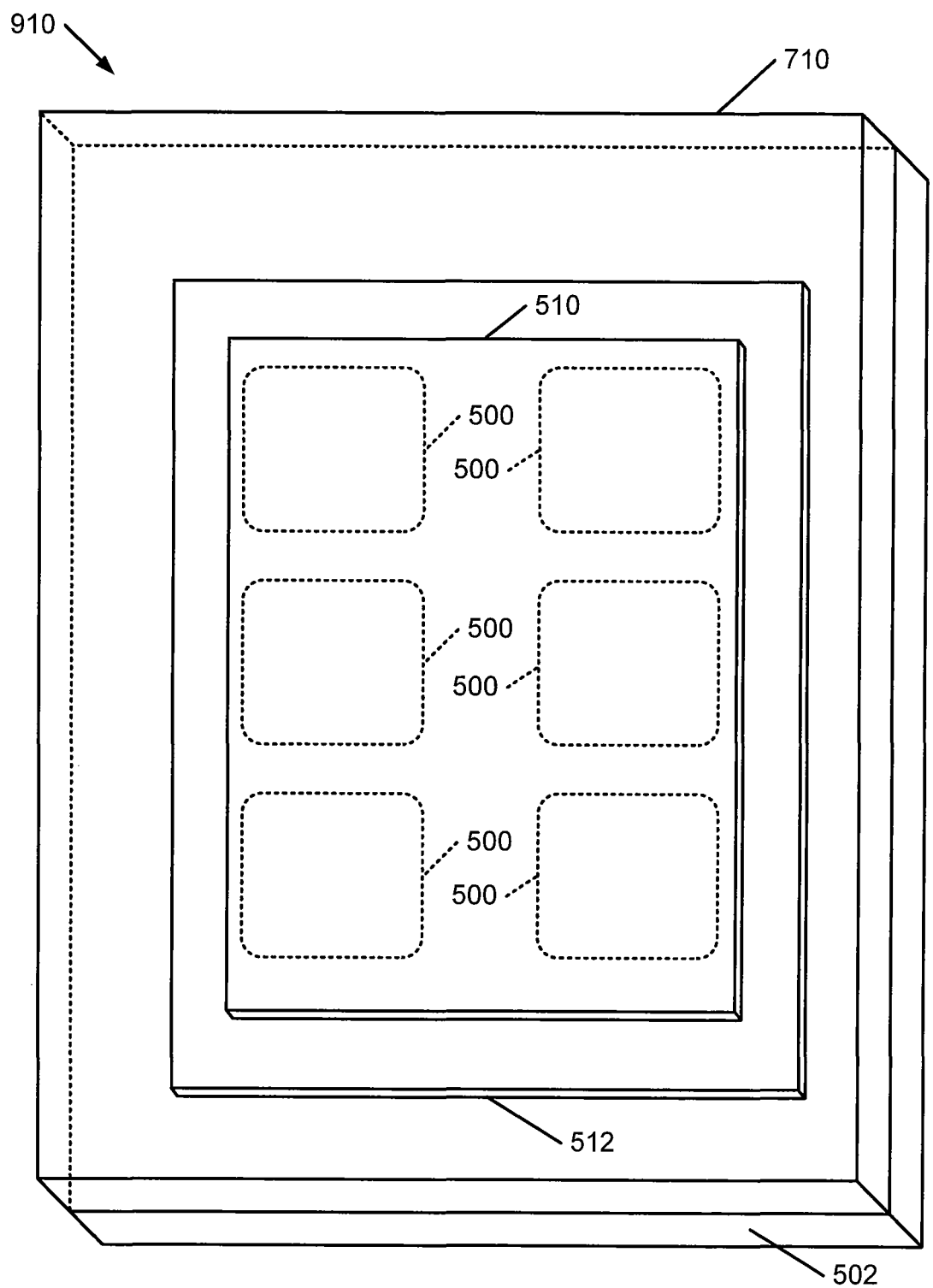
Figure 9C:
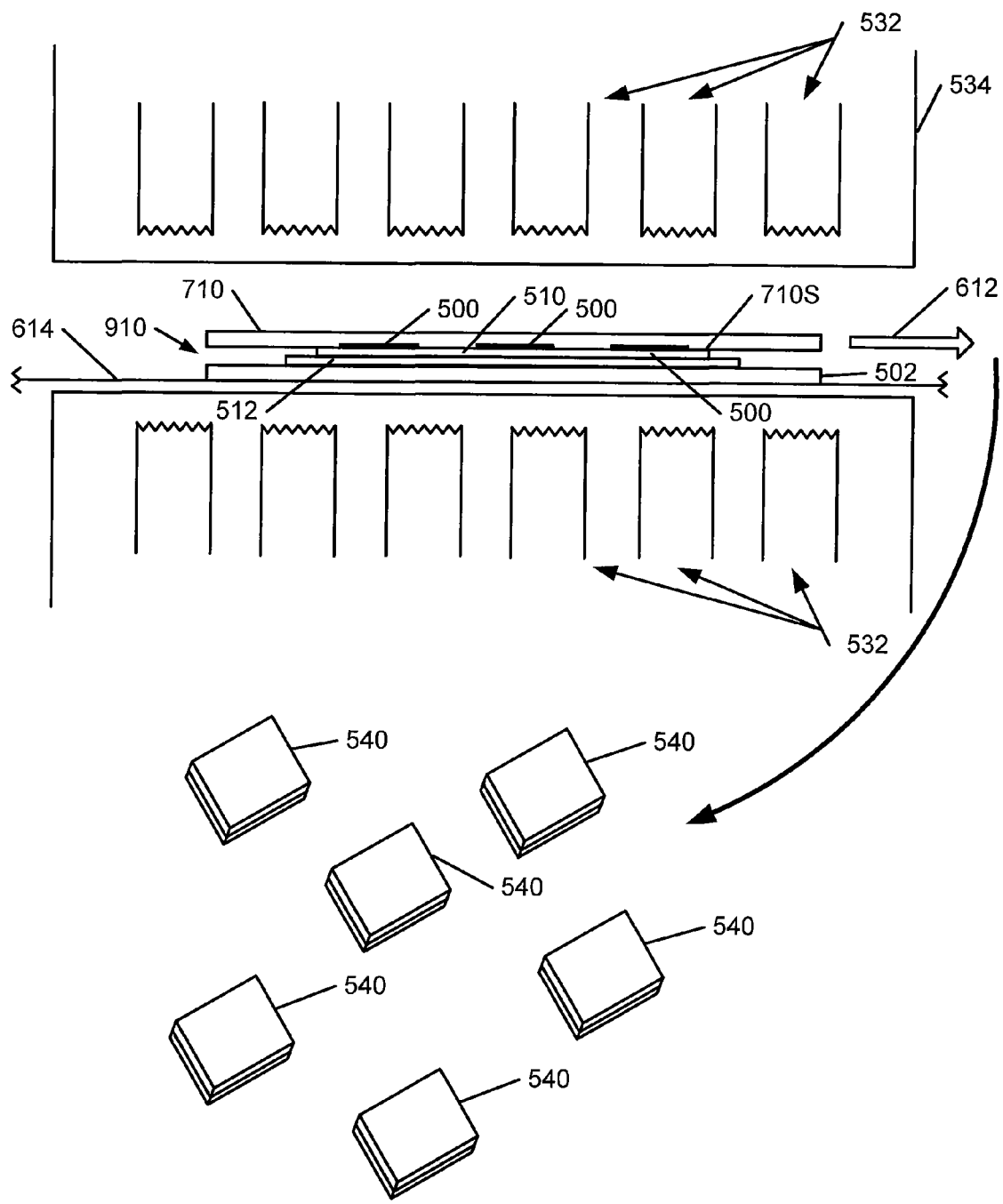

Another example broadband heating system and method in accordance with this invention is shown in FIGS. 9A through 9C. Where the system and method of FIGS. 9A through 9C are similar to those described above for FIGS. 5A through 8C, the same reference numbers will be used and the repetitive description will be omitted. The example system of FIGS. 9A through 9C is somewhat the opposite of the system of FIGS. 5A through 5D. As shown in FIG. 9A, in this example system, first the two sheet members 510 and 512 to be joined are mounted on the base support member 502 in an at least partially overlapping manner (as shown in FIG. 9A, the edges of the sheet members 510 and 512 need not align).

In this example system and method, the infrared absorptive material 500 is applied to a major surface 710S of a cover member 710, e.g., of the various types described above. The infrared absorptive material 500 may be any of the materials described above (e.g., in conjunction with FIGS. 5A through 5D), and they may be applied to the cover member 710 in any of the manners described above (e.g., in conjunction with FIGS. 5A through 5D).

Once positioned on the base support member 502, the sheet members 510 and 512 may be held in place with respect to one another and with respect to the base support member 502 by applying the cover member 710. This action is shown in FIG. 9A by arrow 900, and the resultant assembly 910 for heat welding is shown in FIG. 9B. The infrared absorptive material 500 is shown in broken lines in FIG. 9B to indicate that it lays on the unexposed underside surface 710S of the cover member 710.

Then, as shown in FIG. 9C, the assembly 910 for heat welding may be heated in oven 534 (or other desired broadband heat source), which joins the polymeric sheet members 510 and 512 together and enables production of the two-layered parts 540, e.g., as described above. While the example system illustrated in FIG. 9C has the assembly 910 to be welded moving into and out of the oven 534 (as illustrated by arrow 612) on a conveyance system 614, other ways of introducing the assembly 910 into the oven 534 may be used without departing from this invention, including the manners described above in conjunction with FIG. 5D.

The presence of the infrared absorptive material 500 on the surface 710S of the cover member 710 increases the infrared absorptivity at the location(s) of the infrared absorptive material 500 on the surface 710S of the cover member 710 as compared to an infrared absorptivity of the surface 710S of the cover member 710 at areas away from the infrared absorptive material 500. As some more concrete examples, during the heating step to join the two polymeric materials 510 and 512, a temperature at the surface 710S of the cover member 710 will be at least 10% higher (and in some examples, at least 15% higher or even at least 20% or 25% higher) at the location(s) of the infrared absorptive material 500 as compared to the temperature of the surface 710S of the cover member 710 at locations at least 5 cm away from any infrared absorptive material 500 (these percent temperature differences are based on the temperature differences using the Celsius temperature scale). As another example, during the heating step, a temperature at the surface 710S of the cover member 710 is at least 10° C. higher (and in some examples, at least 15° C. higher or even at least 20° C. or 25° C. higher) at the location(s) of the infrared absorptive material 500 as compared to the temperature of the surface 710S of the cover member 710 at locations at least 5 cm away from any infrared absorptive material 500.

One advantageous aspect of this example system and method according to the invention relates to the fact that neither the first nor the second polymeric sheet member 510 or 512 needs to be treated or doped to increase an infrared energy absorption characteristic thereof. The first and/or second polymeric sheet members 510 and/or 512 also may be substantially transparent to radiation over the visible wavelength spectrum (or over at least a portion of the visible wavelength spectrum). Clean, precise, and well defined welds can be produced (based on the pattern of infrared absorptive material). Moreover, the cover member 710 can be used repeatedly for high volume production of joined two layer articles 540 (e.g., using the same absorptive material 500 pattern). Additionally or alternatively, if desired, the infrared absorptive material pattern on the cover member 710 may be changed by clearing off one pattern (e.g., by washing, scraping, sanding, etc.) and applying a different pattern.

FIGS. 6A through 9C show various examples of this invention in which the assembly to be heated (e.g., assemblies 610, 810, and 910) move through and with respect to the heat source (e.g., oven 534). This is not a requirement. For example, in the system 1000 shown in FIG. 10, the heat source 1002 (e.g., a linear heat element that extends in the X direction or a linearly scanning or translating laser (in the X direction)) moves or scans in one dimension across the assembly 910 to be heated. The one dimensional scan direction (the Y direction) is shown by arrow 1004 in FIG. 10. This type of scanning or translating heating system may be used in place of the illustrated heating systems shown in any of the various example systems of the invention described above in conjunction with FIGS. 2A through 9C. The heat source temperature, scanning speed, and other features of using this type of welding system can be readily ascertained by the skilled artisan through routine experimentation (e.g., dependent on various features, such as materials to be welded, sheet thickness, desired precision or resolution of the weld, etc.).

Figure 10:
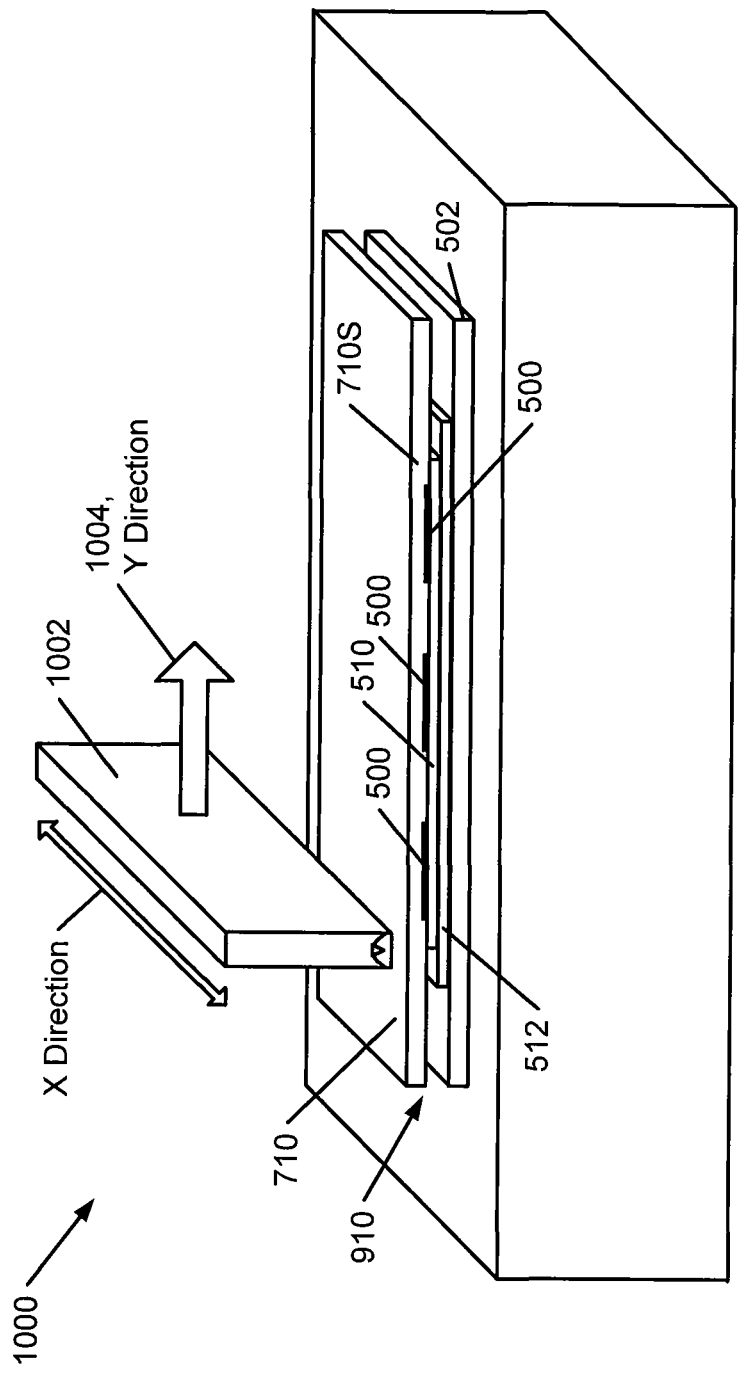
FIG. 10 illustrates an example system and method according to this invention in which a scanning laser or linear heat source moves in one direction with respect to the materials to be heated.
Figure 11:
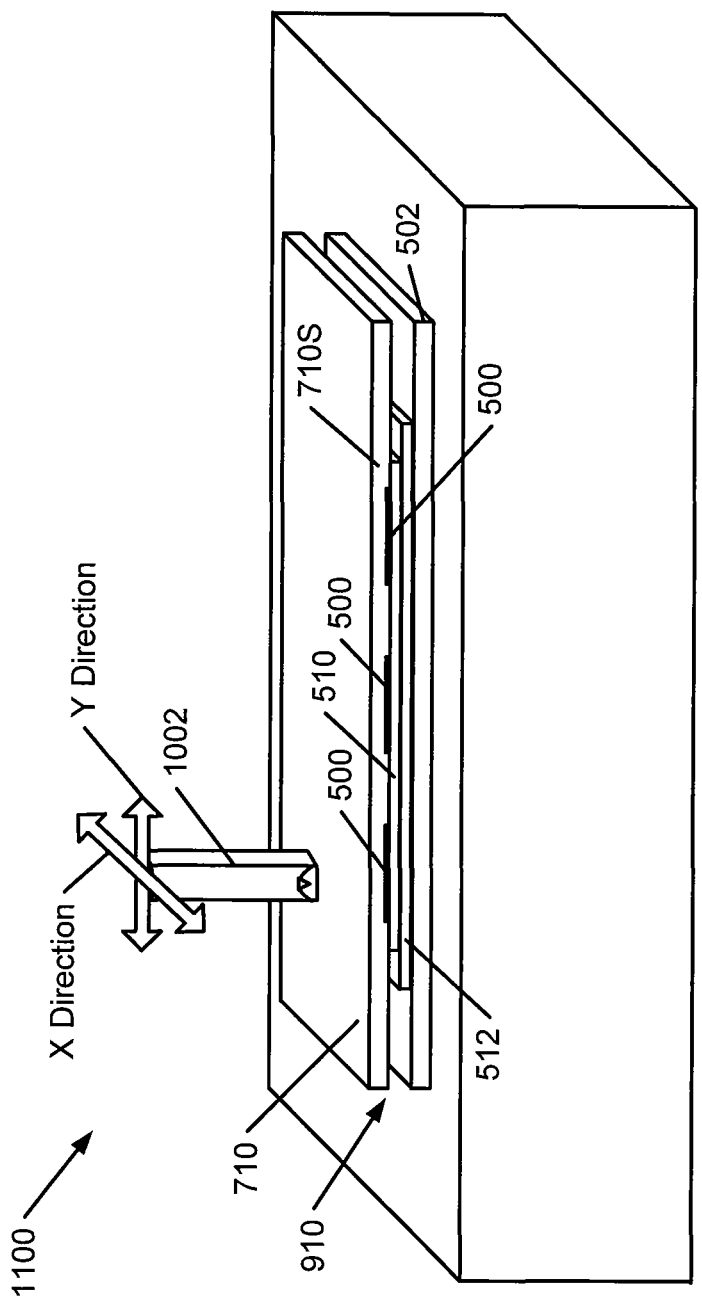
FIG. 11 illustrates an example system and method according to this invention in which a heat source selectively moves in two dimensions (e.g., X-Y translatable) with respect to the materials to be heated.

FIG. 11 shows another example heat source that may be used in conjunction with any of the various systems and methods described above in FIGS. 2A through 9C. Rather than a linear heat source or laser source, as shown in FIG. 10, in this example system 1100, the heat source 1102 is a relatively small source (e.g., a point source, optionally with focusing optics, such as a laser beam or an infrared heat source) that is freely translatable in the X and Y directions (e.g., under computer control). In this manner, the heat source 1102 can be selectively moved to any desired locations with respect to the assembly to be heated (assembly 910, in this illustrated example) to selectively heat (and weld the polymeric sheet materials) at that location. Optionally, if desired, a shutter system (like that described above in conjunction with FIG. 4) may be used to prevent undesired heating of the assembly 910 at areas not intended to be heated or welded.

While the various example systems shown in FIGS. 5A through 11 show horizontally arranged workpieces, those skilled in the art will recognize that any desired orientation of the workpieces for construction and heating may be used without departing from this invention. Also, the various features, components, and steps of the systems and methods shown in FIGS. 5A through 11 can be changed, intermixed, changed in order, used in different combinations, and/or otherwise modified without departing from this invention.

C. Conclusion

Various examples of the present invention have been described above, and it will be understood by those of ordinary skill that the present invention includes within its scope all combinations and subcombinations of these examples. Additionally, those skilled in the art will recognize that the above examples simply exemplify the invention. Various changes and modifications may be made without departing from the spirit and scope of the invention, as defined in the appended claims.

The invention claimed is:

1. A method of joining at least two polymeric sheet portions, comprising:
    arranging a first polymeric sheet portion and a second polymeric sheet portion in an overlapping manner on a base support member such that a major surface of the second polymeric sheet portion is adjacent the base support member, wherein the entire base support member is formed of a non-metallic material that is selected from the group consisting of: graphite, a rubber material, a ceramic material, and a stone material and: (a) is a good absorber of laser energy for at least one laser wavelength or a narrow laser wavelength band, (b) has low heat conductivity, (c) has a high melting point relative to the second polymeric sheet portion, and (d) has a low reflectivity of the laser energy; and
    exposing an overlapped area of the first and second polymeric sheet portions to laser energy for a sufficient time to join the first and second polymeric sheet portions together at the overlapped area exposed to the laser energy, wherein the laser energy is substantially absorbed by the base support member to thereby locally heat the base support member, wherein the heating of the base support member increases a temperature of the second polymeric sheet portion and the first polymeric sheet portion to thereby soften or melt the first and second polymeric sheet portions at the overlapped area exposed to the laser energy and to thereby join the first and second polymeric sheet portions together at the overlapped area exposed to the laser energy.

2. A method according to claim 1, further comprising:
    securing the first and second polymeric sheet portions in place with respect to one another prior to the exposing step.

3. A method according to claim 2, wherein the securing step includes placing a cover member on the base support, wherein the first and second polymeric sheet portions are held together with respect to one another by the cover member.

4. A method according to claim 3, wherein the cover member is substantially transparent to the laser energy and overlays at least some of the overlapped area of the first and second polymeric sheet portions.

5. A method according to claim 1, wherein the first polymeric sheet portion is not treated or doped to increase a laser energy absorption characteristic thereof, and wherein the second polymeric sheet portion is not treated or doped to increase a laser energy absorption characteristic thereof.

6. A method according to claim 1, wherein each of the first and second polymeric sheet portions is substantially transparent to the laser energy.

7. A method according to claim 1, wherein the first and second polymeric sheet portions are substantially transparent to radiation over the visible wavelength spectrum.

8. A method according to claim 1, wherein the first and second polymeric sheet portions are substantially transparent to radiation over at least a portion of the visible wavelength spectrum.

9. A method according to claim 1, wherein the first and second polymeric sheet portions are made from the same polymeric material.

10. A method according to claim 1, wherein the first and second polymeric sheet portions are made from different polymeric materials.

11. A method according to claim 1, wherein each of the first and second polymeric sheet portions is made from a thermoplastic polyurethane material.

12. A method according to claim 1, wherein, in the exposing step, the laser energy is within a wavelength range of 800 to 1200 nm.

13. A method according to claim 1, wherein, in the exposing step, the laser energy is within a wavelength range of 800 to 1000 nm.

14. A method according to claim 1, wherein, in the exposing step, the wavelength of the laser energy is about 808 nm.

15. A method according to claim 1, wherein, in the exposing step, the wavelength of the laser energy is about 940 nm.

16. A method according to claim 1, wherein, in the exposing step, the laser energy is transmitted as a laser beam having a spot width within a range of 0.5 to 3 mm.

17. A method according to claim 1, wherein, in the exposing step, the laser energy is transmitted as a laser beam at a power within a range of 10 to 200 watts.

18. A method according to claim 1, wherein, in the exposing step, the laser energy is transmitted as a laser beam at a scanning speed within a range of 0.25 to 2 m/min.

19. A method of joining at least two polymeric sheet portions, comprising:
    applying an infrared absorptive material to a first location on a surface of a base support member and to a second location on the surface of the base support member, wherein the second location is separate and discrete from the first location, and wherein the infrared absorptive material increases the infrared absorptivity at the first and second locations on the surface of the base support member as compared to an infrared absorptivity at the surface of the base support member at areas away from the first and second locations that do not include infrared absorptive material;

arranging a first polymeric sheet portion and a second polymeric sheet portion in an overlapping manner on the base support member such that an overlapped area of the first and second polymeric sheet portions overlies the first and second locations on the surface of the base support member; and exposing at least some of the overlapped area of the first and second polymeric sheet portions to broadband infrared energy for a sufficient time to join the first and second polymeric sheet portions together at locations adjacent to the first and second locations on the base support member, wherein the infrared energy is substantially absorbed by the infrared absorptive material at the first and second locations to thereby locally heat the first and second polymeric sheet portions at the locations adjacent to the first and second locations, wherein the heating of the first and second polymeric sheet portions increases a temperature of the second polymeric sheet portion and the first polymeric sheet portion to thereby soften or melt the first and second polymeric sheet portions at the overlapped area and to thereby join the first and second polymeric sheet portions together at the overlapped area and not at the areas away from the first and second locations that do not include infrared absorptive material.

20. A method according to claim 19, further comprising:
securing the first and second polymeric sheet portions in place with respect to one another.

21. A method according to claim 20, wherein the securing step includes placing a cover member on the base support, wherein the first and second polymeric sheet portions are held together with respect to one another by the cover member.

22. A method according to claim 21, wherein the cover member is substantially transparent to the broadband infrared energy and overlays at least some of the overlapped area of the first and second polymeric sheet portions.

23. A method according to claim 19, wherein the first polymeric sheet portion is not treated or doped to increase a laser energy absorption characteristic thereof, and wherein the second polymeric sheet portion is not treated or doped to increase a laser energy absorption characteristic thereof.

24. A method according to claim 19, wherein each of the first and second polymeric sheet portions is substantially transparent to the broadband infrared energy.

25. A method according to claim 19, wherein the base support includes a material selected from the group consisting of: graphite, a rubber material, a ceramic material, and a stone material.

26. A method according to claim 19, wherein the first and second polymeric sheet portions are substantially transparent to radiation over the visible wavelength spectrum.

27. A method according to claim 19, wherein the first and second polymeric sheet portions are substantially transparent to radiation over at least a portion of the visible wavelength spectrum.

28. A method according to claim 19, wherein the first and second polymeric sheet portions are made from the same polymeric material.

29. A method according to claim 19, wherein the first and second polymeric sheet portions are made from different polymeric materials.

30. A method according to claim 19, wherein each of the first and second polymeric sheet portions is made from a thermoplastic polyurethane material.

31. A method according to claim 19, wherein the infrared absorptive material includes a carbon black containing material.

32. A method of joining at least two polymeric sheet portions, comprising:

applying an infrared absorptive material to a first location on a surface of a holding member and to a second location on the surface of the holding member, wherein the second location is separate and discrete from the first location, and wherein the infrared absorptive material increases the infrared absorptivity at the first and second locations on the surface of the holding member as compared to an infrared absorptivity of the surface of the holding member at areas away from the first and second locations that do not include infrared absorptive material;

arranging a first polymeric sheet portion and a second polymeric sheet portion to be held in an overlapping manner, at least in part, by the holding member; and exposing at least some of an overlapped area of the first and second polymeric sheet portions to broadband infrared energy for a sufficient time to join the first and second polymeric sheet portions together at locations adjacent to the first and second locations on the holding member, wherein the infrared energy is substantially absorbed by the infrared absorptive material at the first and second locations to thereby locally heat the first and second polymeric sheet portions at the locations adjacent to the first and second locations, wherein the heating of the first and second polymeric sheet portions increases a temperature of the second polymeric sheet portion and the first polymeric sheet portion to thereby soften or melt the first and second polymeric sheet portions at the overlapped area and to thereby join the first and second polymeric sheet portions together at the overlapped area and not at the areas away from the first and second locations that do not include infrared absorptive material.

33. A method according to claim 32, wherein the first polymeric sheet portion is not treated or doped to increase a laser energy absorption characteristic thereof, and wherein the second polymeric sheet portion is not treated or doped to increase a laser energy absorption characteristic thereof.

* * * * *